US008553605B2

(12) United States Patent
Cho et al.

(10) Patent No.: US 8,553,605 B2
(45) Date of Patent: Oct. 8, 2013

(54) PACKET IDENTIFICATION FOR POWER SAVING IN WIRELESS COMMUNICATION NETWORKS

(75) Inventors: James S. Cho, Mountain View, CA (US); Youhan Kim, Albany, CA (US); Ning Zhang, Saratoga, CA (US); Shiwei Zhao, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/957,077

(22) Filed: Nov. 30, 2010

(65) Prior Publication Data

US 2012/0063335 A1 Mar. 15, 2012

Related U.S. Application Data

(60) Provisional application No. 61/381,785, filed on Sep. 10, 2010.

(51) Int. Cl.
*H04H 20/71* (2008.01)

(52) U.S. Cl.
USPC ............................ 370/312; 370/310; 370/349

(58) Field of Classification Search
USPC ................. 370/431, 311, 350, 336, 503, 342, 370/31, 312, 349
See application file for complete search history.

(56) References Cited

U.S. PATENT DOCUMENTS

| 7,002,938 | B2 | 2/2006 | Hester et al. | |
|---|---|---|---|---|
| 2004/0073813 | A1 | 4/2004 | Pinkas et al. | |
| 2006/0165037 | A1* | 7/2006 | Jung et al. | 370/331 |
| 2007/0189221 | A1* | 8/2007 | Isobe et al. | 370/331 |
| 2008/0049779 | A1* | 2/2008 | Hopmann et al. | 370/431 |
| 2008/0187069 | A1 | 8/2008 | Qu et al. | |
| 2009/0052362 | A1* | 2/2009 | Meier et al. | 370/311 |
| 2009/0080357 | A1 | 3/2009 | Song et al. | |
| 2009/0168745 | A1* | 7/2009 | Ahmadi et al. | 370/350 |

OTHER PUBLICATIONS

International Search Report and Written Opinion—PCT/US2011/051085—ISA/EPO—Jan. 6, 2012, 15 pages.
International Preliminary Report on Patentability—PCT/US2011/051085—ISA/EPO—Oct. 9, 2012, 4 pages.
Stacey, Robert et al., "Specification Framework for TGac", doc.: IEEE 802.11-09/0992r13 IEEE P802.11Wireless LANs Jul. 2010 , 25 pages.
Youhan, Kim et al., "AID Selection", doc.: IEEE 802.11-10/xxxxr0 Sep. 2010 , 9 pages.
"PCT Application No. PCT/US2011/051085 International Preliminary Report on Patentability", Mar. 21, 2013 , 14 pages.

* cited by examiner

*Primary Examiner* — Anh-Vu Ly
*Assistant Examiner* — Gustavo Lopez-Vargas
(74) *Attorney, Agent, or Firm* — DeLizio Gilliam, PLLC

(57) ABSTRACT

A network coordinator can assign an association identifier (AID) and/or a group identifier (GID) to identify a client station to which a packet is to be transmitted and to enable the client station to determine whether to receive an incoming packet. The network coordinator can randomly generate a base AID that is representative of the network coordinator and can assign at least one AID to client stations to minimize the probability of client stations associated with proximate network coordinators being assigned the same AIDs. The network coordinator can also randomly assign at least one GID to a group of client stations to minimize the probability of groups of client stations associated with the proximate network coordinators being assigned the same GID. The client station can analyze indications of a received AID and/or received GID to determine whether to receive the packet or whether to switch to an inactive power state.

20 Claims, 10 Drawing Sheets

PACKET IDENTIFICATION FOR POWER SAVING IN WIRELESS COMMUNICATION NETWORKS

RELATED APPLICATION

This application claims the priority benefit of U.S. Provisional Application Ser. No. 61/381,785 filed on Sep. 10, 2010.

INTRODUCTION

Embodiments of the inventive subject matter generally relate to the field of wireless communications systems, and, more particularly, to packet identification for power saving in wireless communication networks.

Multiple antennas can be used in wireless network devices (e.g., access points and client stations) to address capacity gain in heavy multipath wireless communication channels. A significant capacity gain can be obtained over the single antenna scheme by using the multiple-input multiple-output (MIMO) technique exploiting the diversity of signal paths between the multiple antennas. In accordance with the MIMO technique, the wireless network devices can employ multiple antennas for both transmitting data and for receiving data to improve communication performance of the wireless network devices.

SUMMARY

Various embodiments for packet identification for power saving in wireless communication networks are disclosed. In one embodiment, an association identifier (AID) and group identifier (GID) processing unit of a wireless network device can randomly generate a base association identifier that is representative of the wireless network device based on one or more association identifier constraints. At least one association identifier can be assigned to a client device connected to the wireless network device based, at least in part, on the base association identifier. At least one group identifier can be randomly generated for the client device based, at least in part, on one or more group identifier constraints. The at least one group identifier can be assigned to the client device. In response to determining to transmit a packet to the client device, at least a predefined number of bits of one of the at least one association identifier and one of the at least one group identifier can be inserted into the packet to identify the client device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
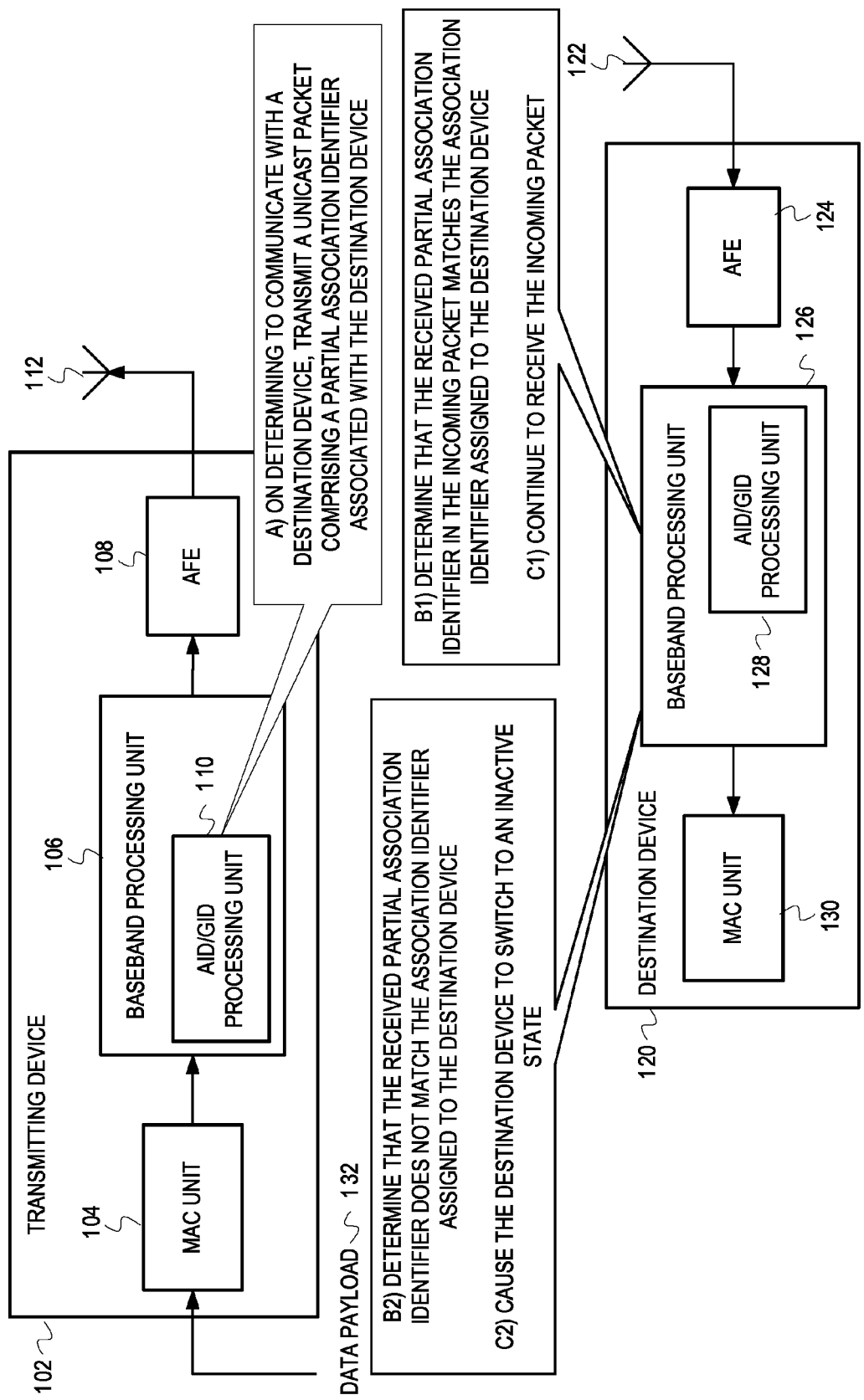
FIG. 1 is an example block diagram illustrating example operations for packet identification using an association identifier.

The description that follows includes exemplary systems, methods, techniques, instruction sequences, and computer program products that embody techniques of the present inventive subject matter. However, it is understood that the described embodiments may be practiced without these specific details. For instance, although examples refer to a power saving mechanism for wireless local area network (WLAN) devices that support the 802.11ac draft specification, in other embodiments WLAN devices that support other suitable communication standards such as 802.11a/b/g/n can implement the power saving mechanism described herein. Also, examples refer to a client station receiving packets, however in other examples, an access point of an infrastructure network or a group owner of a peer-to-peer (P2P) network may receive packets (e.g., transmitted by the client station). Furthermore, a destination device that transmits/receives packets could be an access point, a group owner, a client station connected to the access point/group owner, or another suitable network device capable of transmitting/receiving packets. In other instances, well-known instruction instances, protocols, structures, and techniques have not been shown in detail in order not to obfuscate the description.

For unicast transmissions, the frame format of a single user packet transmitted to a single destination device using the 802.11ac draft specification comprises an association identifier (AID) field. The AID field comprises a value assigned to the destination device (e.g., a wireless local area network (WLAN) client station) by a network coordinator (e.g., an access point in an infrastructure network or a group owner in a peer-to-peer (P2P) network) during the destination device's association. Typically, the access point (or the group owner) assigns an AID to associated client stations within its basic service set (BSS) starting from a predetermined fixed number (e.g., starting from 1). Therefore, client stations in neighboring or overlapping BSSs (OBSSs) could be assigned same AIDs. If two or more BSSs are in close proximity and/or on the same communication channel, an access point or client station of a first BSS may receive packets transmitted in another proximate second BSS. In other words, if client station A of the first BSS is assigned an AID of 101 and client station B of the second BSS is also assigned an AID of 101, the client station A may receive packets intended for the client station B and may remain awake instead of switching to an inactive state (e.g., a power save mode). For multicast/broadcast transmissions, the 802.11 ac draft specification also enables the access point to employ a group identifier (GID) to identify a group of client stations within the BSS to which packets are to be transmitted. However, access points typically generate and assign GIDs beginning at a predetermined base GID. Therefore, groups of client stations in OBSSs could be assigned same GID causing the group of the client stations in one BSS to receive a packet destined for a group of client stations with the same GID in the OBSS, thus minimizing power savings.

Furthermore, in accordance with the 802.11ac draft specification, special packets such as broadcast packets, multicast packets, and packets transmitted from a client station to the access point ("STA-to-AP packets") are typically assigned a common special AID. For example, an AID of all zeros may be assigned to indicate a broadcast packet, a multicast packet, and a STA-to-AP packet. Therefore, if the client station detects a packet with an AID of all zeros, the client station may not be able to determine whether the detected packet is a broadcast packet from the access point or whether the detected packet is a STA-to-AP packet transmitted by another client station to the access point. This can prevent the client station from switching to the power save mode on detecting packets sent by other client stations to the access point, which can account for large portion of packets on the communication network, and therefore can minimize power savings.

In some embodiments, an access point can be configured to generate a base AID in a random manner to enable better power saving on the client stations of the BSS governed by the access point. The base AID may be representative of the AID assigned to the access point. The access point can generate the base AID, subject to one or more AID constraints (e.g., knowledge of a base AID of an OBSS), so that the AIDs assigned by the access point do not overlap with the AIDs assigned in the OBSSs. This can ensure that the probability of client stations in the OBSSs being assigned the same AID is minimized as compared to the traditional operations for assigning AIDs. The access point can also be configured to generate and assign GIDs to groups of client stations in a random manner to minimize the probability of groups of client stations in OBSSs being assigned the same GID. Furthermore, the access point may assign more than one AID to each client station and/or more than one GID to each group of client stations. The access point may select an appropriate AID and/or an appropriate GID to meet performance requirements. In accordance with some embodiments, the access point can transmit a partial AID (e.g., a subset of the bits that constitute the AID) and/or a GID in a packet destined for one or more client stations. The client station can compare the received partial AID with the AID assigned to the client station and/or can compare the received GID to the GID assigned to the group to which the client station belongs. If there is a match, then the client station can continue to parse and receive the packet. Otherwise, the client station can switch to the inactive power state, thus improving power conservation.

In some embodiments, the access point can also be configured to assign distinct special AIDs and/or GIDs for each type of special packet. For example, a special AID can be assigned for the STA-to-AP packets (e.g., the base AID or the AID assigned to the access point of the BSS) so that all STA-to-AP packets use a same special AID, and a second special AID can be assigned to indicate broadcast packets. By assigning distinct special AIDs and GIDs for each type of special packet, the unicast STA-to-AP packets transmitted to the access point can be distinguished from broadcast/multicast packets transmitted by the access point. This can enable the client stations to switch to the inactive state on detecting a packet that is destined for the access point or another client station, as will be further described below.

FIG. 1 is an example block diagram illustrating example operations for packet identification using an association identifier. FIG. 1 depicts a transmitting device 102 and a destination device 120. The transmitting device 102 may be an access point in an infrastructure network, a group owner in a peer-to-peer network, or other suitable network coordinator. The destination device 120 can be any suitable network device (e.g., a client station) connected to the transmitting device 102 and in the basic service set (BSS) governed by the transmitting device 102. The transmitting device 102 comprises a medium access control (MAC) unit 104, a baseband processing unit 106, an analog front end 108, and an antenna 112. The baseband processing unit 106 comprises an AID/GID processing unit 110. Likewise, the destination device 102 comprises a medium access control (MAC) unit 130, a baseband processing unit 126, an analog front end 124, and an antenna 122. The baseband processing unit 126 comprises an AID/GID processing unit 128. The AID/GID processing unit 128 implements functionality to determine whether the destination device 120 should receive and process an incoming packet. Accordingly, the AID/GID processing unit 128 can cause the destination device 120 to either remain in an active state and receive the incoming packet or switch to an inactive state (e.g., a low powered state, a sleep mode, etc.), as will be described in stages A, B1-C1, and B2-C2 of FIG. 1.

At stage A, on determining to communicate with the destination device 120, the AID/GID processing unit 110 of the transmitting device 102 inserts a partial AID associated with the destination device 120 into a unicast packet to be transmitted to the destination device 120. The MAC unit 104 and the baseband processing unit 106 can generate a packet (described below in FIG. 3) that comprises a data payload 132 to be transmitted to the destination device 120. The AID/GID processing unit 110 can determine the AID of the destination device 120 (e.g., based on accessing a look-up table) and can insert the partial AID associated with the destination device 120 in a preamble of the packet to be transmitted. In one example, 9 LSBs of the AID of the destination device 120 can be transmitted as the partial AID. It is noted, however, that in other implementations, other suitable number of bits of the AID can be transmitted as the partial AID (e.g., depending on the format of the packet to be transmitted). The baseband processing unit 106 can also comprise baseband processing units (not shown) such as encoders, IFFT units, modulation units, etc. to generate an RF signal that comprises the packet. The AFE 108 can comprise one or more filtering units, amplification stages, mixers, etc. that further process the RF signal. The AFE 108 can then transmit the RF signal (and the packet) to the destination device 120 via the antenna 112.

At stage B1, the AID/GID processing unit 128 of the destination device 120 reads the partial AID from the preamble of the incoming packet ("received partial AID) and determines that the received partial AID matches the AID assigned to the destination device 120. The AFE 124 of the destination device 120 receives the RF signal comprising the packet via the antenna 122. The AFE 124 can comprise one or more amplification stages to amplify the received RF signal, filtering stages to remove unwanted bands of frequencies, mixer stages to down-convert the received RF signal, an automatic gain control (AGC) unit to adjust the gain to an appropriate level for a range of received RF signal amplitude levels, an analog to digital converter (ADC) to convert the received RF signal into a digital signal, etc. The baseband processing unit 126 of the destination device 120 can further process the received RF signal and can extract the preamble of the incoming packet received from the transmitting device 102. The AID/GID processing unit 128 can analyze the received partial AID in the preamble of the packet to determine whether to continue receiving the incoming packet, or whether to terminate receiving the incoming packet and switch to the inactive state. At stage B1, the AID/GID processing unit 128 compares the received partial AID with the corresponding bits (e.g., the 9 LSBs) of the AID assigned to the destination device 120 and determines that the received partial AID matches the AID assigned to the destination device 120.

At stage C1, the destination device 120 (e.g., the baseband processing unit 126) continues to receive the incoming packet. As one example, on determining that the received partial AID matches the AID of the destination device 120, the baseband processing unit 126 can continue to receive/process the incoming packet. As another example, on determining that the received partial AID matches the AID of the destination device 120, the AID/GID processing unit 128 can generate a notification indicating that the destination device 120 should remain in the active state and should continue to receive/process the incoming packet. The baseband processing unit 126 can provide demodulated bits of the received packet to the MAC unit 130 of the destination device 120 for further processing.

At stage B2, the AID/GID processing unit 128 determines that the received partial AID does not match the AID of the destination device 120. For example, if the partial AID represents the 9 least significant bits (LSBs) of the AID of a destination device, the AID/GID processing unit 128 may determine that the received partial AID in the preamble of the incoming packet does not match the corresponding 9 LSBs of the AID assigned to the destination device 120.

At stage C2, the AID/GID processing unit 128 causes the destination device 120 to switch to an inactive state. In one example, the AID/GID processing unit 128 can generate a notification indicating that the incoming packet is not destined for the destination device 120. Accordingly, the baseband processing unit 126 can stop receiving the incoming packet. Also, one or more components of the destination device 120 (e.g., radio hardware) can be temporarily shut down or can switch to the inactive state.

Figure 2:
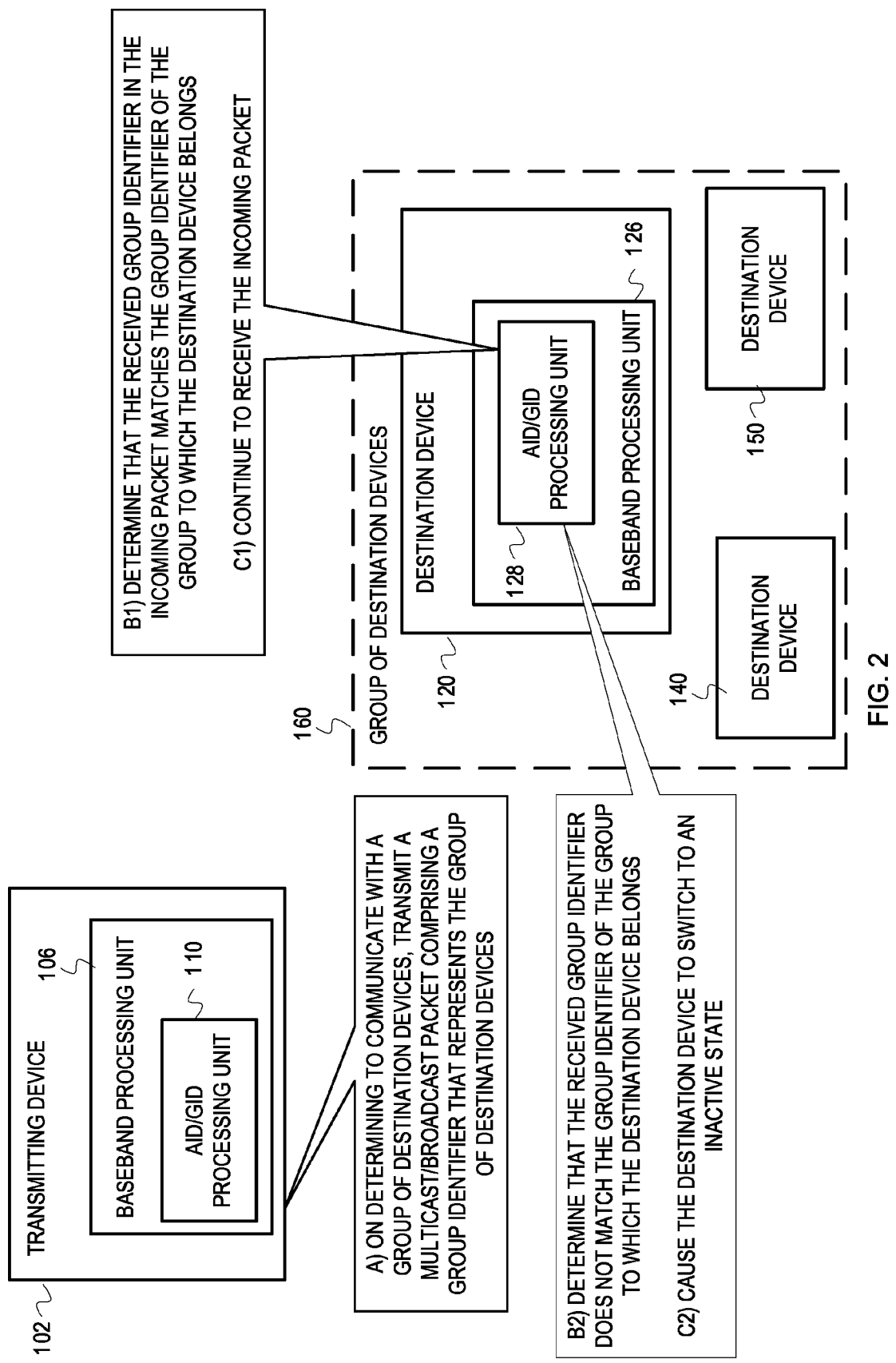
FIG. 2 is an example conceptual diagram illustrating example operations for packet identification using a group identifier.

FIG. 2 is an example conceptual diagram illustrating example operations for packet identification using a group identifier (GID). FIG. 2 depicts the transmitting device 102 of FIG. 1 and a group of destination devices 160. The group of destination devices 160 comprises the destination device 120 of FIG. 1 and destination devices 140 and 150. The destination devices 140 and 150 may comprise the same components (e.g., a MAC unit, an AID/GID processing unit, a baseband processing unit, an AFE, etc.) as the destination device 120 of FIG. 1. It is noted that for simplicity some components of the transmitting device 102 and the destination device 120 have not been depicted in FIG. 2.

At stage A, on determining to communicate with a group of destination devices 160, the AID/GID processing unit 110 of the transmitting device 102 inserts a GID, that represents the group of destination devices 160, into a multicast/broadcast packet to be transmitted to the group of destination devices 160. In a multi-user environment, the transmitting device 102 (e.g., an access point) can encode and transmit packets to multiple destination devices 120, 140, and 150 connected to the transmitting device 102 at the same time. The transmitting device 102 can use the GID to identify the group of destination devices 160 that are intended to receive the packets. As will be described below, on receiving the packets, an AID/GID processing unit 128 of each of the destination devices 120, 140, and 150 (that comprise the group of destination devices 160) can analyze the GID in the preamble of the incoming packet ("received GID") to determine whether the incoming packet should be processed.

At stage B1, the AID/GID processing unit 128 of the destination device 120 determines that the received GID indicated in a preamble of the incoming packet matches the GID of the group 160 to which the destination device 120 belongs. For example, the destination devices 120, 140 and 150 may be designated as a group of destination devices 160 and may be assigned a GID of "25". The AID/GID processing unit 128 can read the received GID and can determine whether the received GID has a value of "25". At stage B1, the AID/GID processing unit 128 determines that the received GID has a value of "25" or, in other words, determines that the received GID is equal to a GID assigned to the destination device 120. Likewise, the AID/GID processing units of the destination devices 140 and 150 can also determine that the received GID matches the GID assigned to the group of destination devices 160.

At stage C1, the destination device 120 (e.g., the baseband processing unit 126) continues to receive the incoming packet. In one example, the baseband processing unit 126 can continue to receive the incoming packet if the AID/GID processing unit 128 determines that the received GID matches the GID assigned to the destination device 120. In another example, on determining that the received GID matches the GID assigned to the destination device 120, the AID/GID processing unit 128 can generate a notification indicating that the destination device 120 should remain in the active state and should continue to receive/process the incoming packet. The baseband processing unit 126 can provide demodulated bits of the received packet to the MAC unit 130 of the destination device 120 for further processing. Likewise, the destination devices 140 and 150 can also continue to receive the incoming packet destined for the group of destination devices 160.

At stage B2, the AID/GID processing unit 128 determines that the received GID does not match the GID assigned to the destination device 120. With reference to the above example, where the group of destination devices 160 is assigned a GID of "25", the AID/GID processing unit 128 may determine that the received GID has a value of "50". Likewise, the AID/GID processing units of the destination devices 140 and 150 can also determine that the received GID does not match the GID assigned to the group of destination devices 160.

At stage C2, the AID/GID processing unit 128 causes the destination device 120 to switch to an inactive state. In one example, the AID/GID processing unit 128 can generate a notification indicating that the incoming packet is not destined for the destination device 120. Accordingly, the baseband processing unit 126 can stop receiving the incoming packet. Also, one or more components of the destination device 120 (e.g., radio hardware) can be temporarily shut down or can switch to the inactive state. Likewise, the AID/GID processing units of the destination devices 140 and 150 can also cause their respective destination devices to switch to the inactive state.

Figure 3:
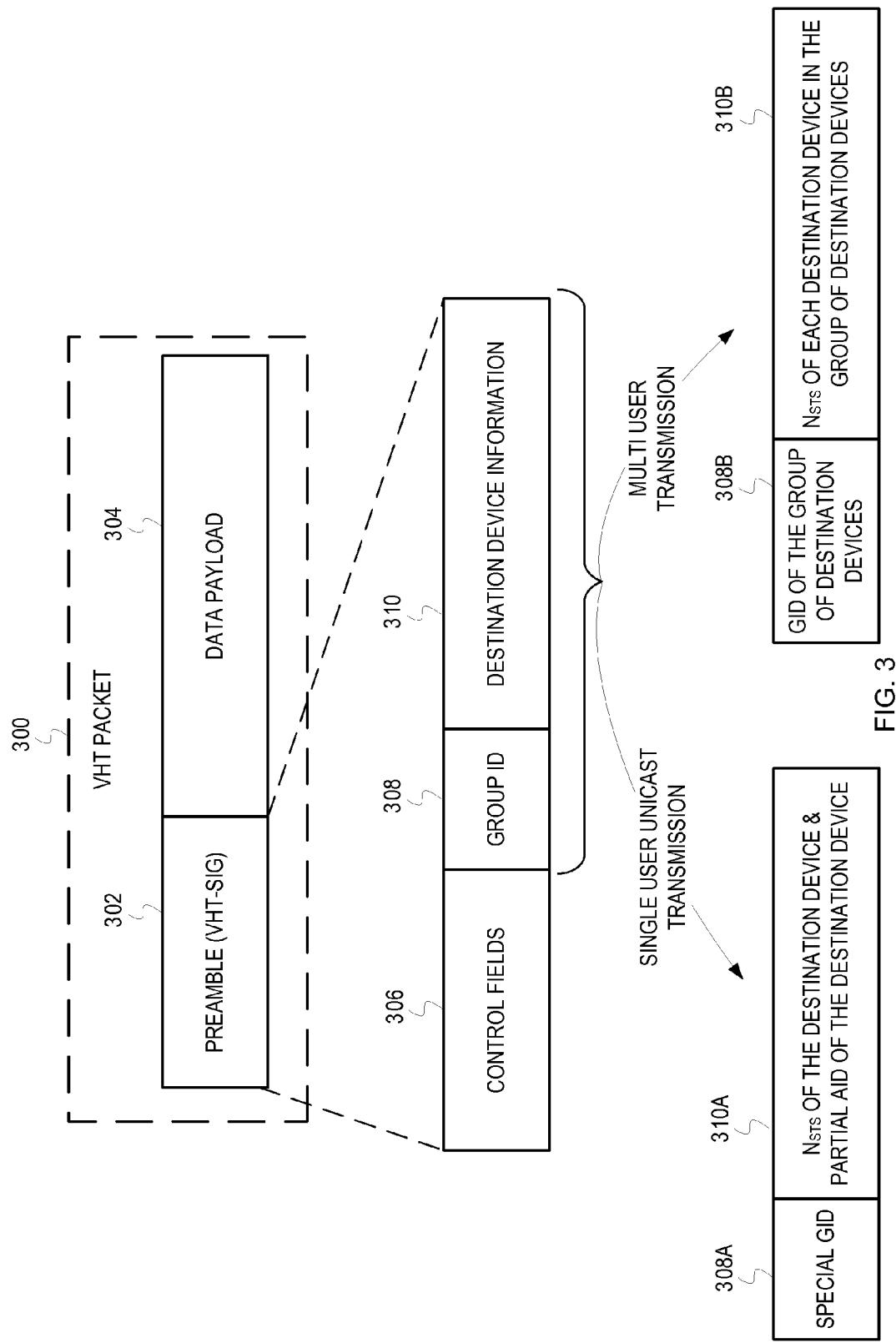
FIG. 3 depicts an example VHT packet format.

FIG. 3 depicts an example packet format 300. In one example, the packet may be a very high throughput (VHT) packet 300. The VHT packet 300 comprises a preamble field 302 (also called a VHT-SIG field or a Physical Layer Convergence Procedure (PLCP) header) and a data payload field 304. The preamble field 302 comprises control fields 306, a GID field 308, and a destination device information field 310. In one example, the control fields 306 can comprise bandwidth information and space-time block coding (STBC) information. The GID field 308 can be a 6-bit field and the destination device information field 110 can be a 12-bit field. The GID field 308 and the destination device information field 310 can indicate whether the VHT packet 300 is for a single destination device ("single user transmission") or for multiple destination devices ("multi-user transmission"). The GID field 308 and the destination device information field 310 can comprise different values depending on whether the VHT packet 300 is used for a single user transmission or a multi-user transmission.

When used for a single user unicast transmission, the GID field 308 can comprise a special GID 308A. As will be described below, the special GID 308A can be a predetermined bit sequence that indicates that the VHT packet 300 is destined for a single destination device. In one example, a combination of six 1s can be transmitted to indicate that the VHT packet 300 is a single user transmission. When the GID field 308 indicates the single user transmission, the destination device information field 310 can comprise a partial AID of the destination device and a number of space-time streams ($N_{sts}$) associated with the destination device. In one example, the partial AID can comprise 9 LSBs of the full AID (11 bits, in one implementation) assigned to the destination device. Thus, if the destination device information field 310 comprises 12 bits, the partial AID can be transmitted in the 9 LSBs of the destination device information field 310 and the $N_{sts}$ associated with the destination device can be transmitted in the 3 MSBs of the destination device information field 310. It is noted that the destination device may be a client station connected to an access point (or to a group owner) or the access point (or the group owner) itself when the VHT packet 300 is transmitted by the connected client station. The destination device that is assigned an AID that matches the partial AID indicated in the destination device information field 110 can receive and process the VHT packet 300. Other destination devices with AIDs that do not match the partial AID indicated in the destination device information field 110 may stop receiving the incoming packet and may switch to the inactive power state (thus conserving power).

When used for a multi-user transmission, the GID field 308 (of the VHT packet 100) can be used by an access point in a downlink multi-user (DL-MU) multiple input multiple output (MIMO) environment to encode and transmit packets to multiple destination devices (i.e., client stations connected to the access point) at the same time. The GID field 308 can comprise a GID 308B that identifies a group of destination devices that are intended to receive the packets. When the GID field 308 indicates the multi-user transmission, the destination device information field 310B can indicate the number of space-time streams ($N_{sts}$) associated with each destination device in the group of destination devices. In one example, the group of destination devices may comprise four destination devices. Thus, if the destination device information field 310 comprises 12 bits, the number of space-time streams for each of the four destination devices (i.e., 3 bits per destination device) that constitute the group can be transmitted. It is noted, however, that the packet format shown in FIG. 3 is an example. In other implementations, the VHT packet 300 can comprise any suitable number of fields, any suitable number of bits, and the group can comprise any suitable number of destination devices. On receiving the preamble 302 of the VHT packet 300, the destination device 120 (e.g., the AID/GID processing unit 128) can analyze the GID field 308 and the destination device information field 310A to determine whether the destination device 120 should continue receiving the VHT packet 300 or whether the destination device 120 should switch to the inactive state, as will be described in FIGS. 6-7.

Figure 4:
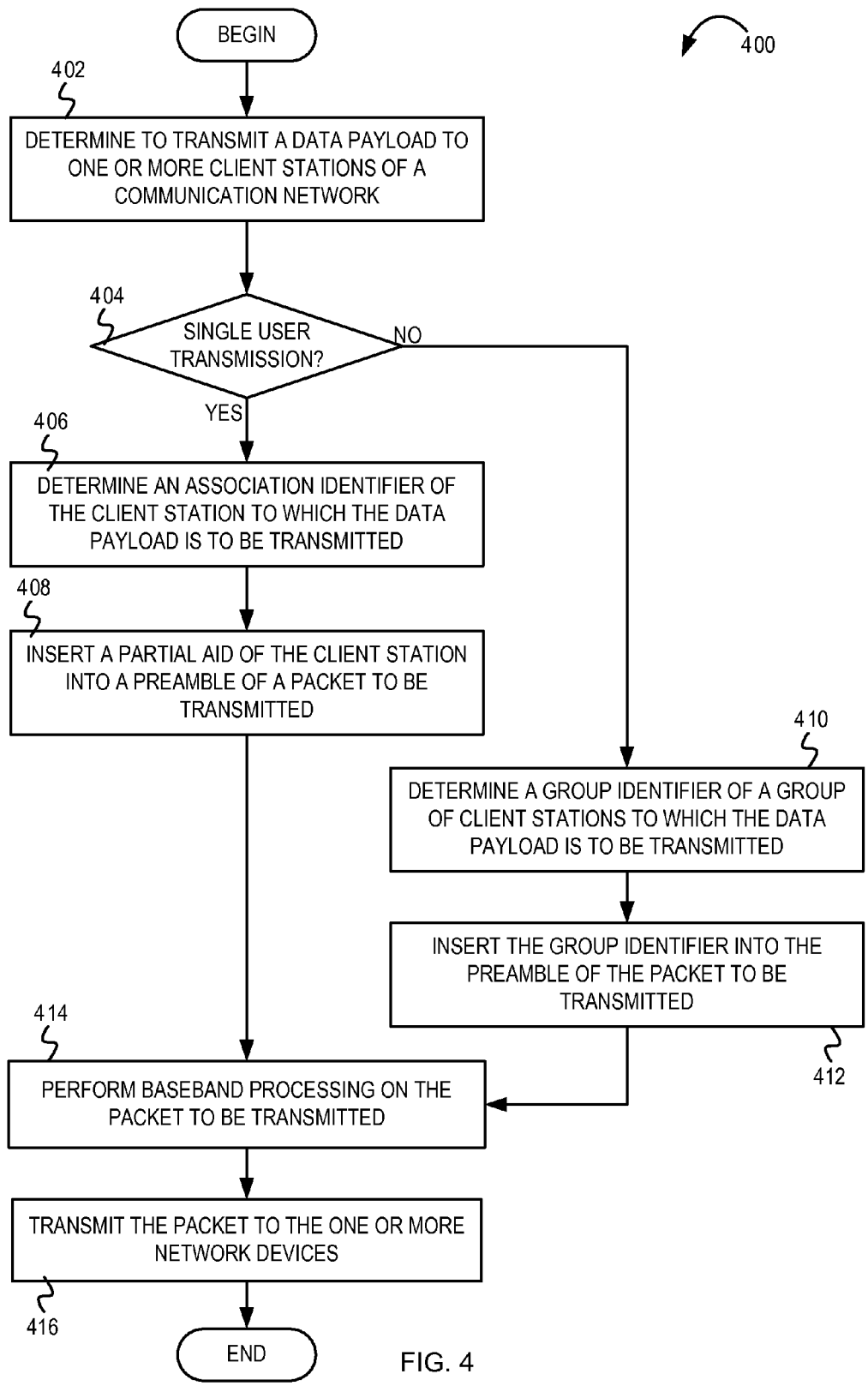
FIG. 4 is a flow diagram illustrating example operations of an access point transmitting a packet indicating either a single-user transmission or a multi-user transmission.

FIG. 4 is a flow diagram ("flow") 400 illustrating example operations of an access point transmitting a packet indicating either a single-user transmission or a multi-user transmission. The flow 400 begins at block 402.

At block 402, the access point determines to transmit a data payload to one or more client stations of a communication network. With reference to FIG. 1, the MAC unit 104 of the transmitting device (e.g., the access point) 102 can receive a data payload 132 to be transmitted to the destination device 120 (e.g., the client station). The flow continues at block 404.

At block 404, it is determined whether the data payload is part of a single user transmission. For example, the AID/GID processing unit 110 of the access point can determine whether the data payload 132 is part of a single user transmission. In other words, the AID/GID processing unit 110 can determine whether the data payload 132 is intended to be transmitted to one client station or to multiple client stations. If it is determined that data payload 132 is part of a single user transmission, the flow continues at block 406. If it is determined that data payload 132 is part of a multi-user transmission, the flow continues at block 410.

At block 406, an AID of the client station to which the data payload is to be transmitted is determined. The flow 400 moves from block 404 to block 406 on determining that the data payload 132 is part of a single-user transmission. For example, the AID/GID processing unit 110 of the access point can determine the AID of the client station to which the data payload 132 is to be transmitted. The AID of the client station may be assigned by the access point (or a network coordinator of the communication network to which the client station belongs) during the client station's association, as will be further described below with reference to FIG. 8. The AID identifies the client station within a basic service set (BSS). The access point may keep track of AIDs assigned to each client station in the BSS. In some implementations, as will be further described in FIG. 5, multiple AIDs may be assigned to the client station. The AID/GID processing unit 110 of the access point can select one of the multiple AIDs assigned to the client station to meet performance requirements. The flow continues at block 408.

At block 408, a partial AID of the client station is inserted into a preamble of a packet to be transmitted to the client station. For example, the baseband processing unit 106 can encapsulate the data payload 132 to generate a VHT packet (as depicted in FIG. 3). The AID/GID processing unit 110 can determine the partial AID of the client station from the full AID of the client station determined at block 406. The AID/GID processing unit 110 can also insert the partial AID of the client station in the preamble of the VHT packet 300 to be transmitted. In is noted, however, that in other embodiments the MAC unit 104 of the access point can insert the partial AID of the client station in the preamble of the VHT packet 300 to be transmitted. In one example, 9 LSBs of the AID of the client station can be transmitted as the partial AID. In another example, any suitable number of bits of the full AID (determined at block 406) can be transmitted as the partial AID of the client station (e.g., depending on the frame format of the VHT packet 300). Additionally, the AID/GID processing unit 110 can also insert a special GID in the GID field 308 of the VHT packet 300 to indicate that the VHT packet 300 is destined for a single client station. In some implementations, as will be further described in FIG. 5, multiple special GIDs may be assigned to represent a single user transmission. The AID/GID processing unit 110 can select one of the multiple special GIDs that represent the single user transmission to meet performance requirements. The flow continues at block 414.

At block 410, a group identifier of a group of client stations to which the data payload is to be transmitted is determined. The flow 400 moves from block 404 to block 410 on determining that the data payload 132 is part of a multi-user transmission. For example, the AID/GID processing unit 110 of the access point can determine the GID of the group of client stations 160 of FIG. 2 to which the data payload 132 is to be transmitted. The access point may allocate two or more client stations to a group and may assign the GID to the group of the two or more client stations, as will be further described below with reference to FIG. 9. The GID enables the client stations that comprise the group to be identified and enables packets to be transmitted to the entire group of client stations at the same time. The access point may keep track of GIDs assigned to each group of client stations in the BSS. In some implementations, as will be further described in FIG. 5, multiple GIDs may be assigned to the same group of client stations. The AID/GID processing unit 110 of the access point can select one of the multiple GIDs to meet performance requirements. The flow continues at block 412.

At block 412, the GID is inserted into the preamble of the packet to be transmitted. For example, the baseband processing unit 106 can encapsulate data payload 132 to generate the VHT packet 300 (as depicted in FIG. 3). The AID/GID processing unit 110 can insert the GID determined at block 410 in the preamble 302 of the VHT packet 300. It is noted, however, that in other embodiments the MAC unit 104 of the access point can insert the GID that represents the group of client stations in the preamble 302 of the VHT packet 300. The flow continues at block 414.

At block 414, baseband processing is performed on the packet to be transmitted. In one implementation, a baseband processing unit 106 of the access point can perform encoding and modulation operations on the VHT packet 300 to be transmitted. The flow continues at block 416.

At block 416, the multicast/broadcast packet is transmitted to the one or more client stations. For example, the analog front end (AFE) 108 of the access point can transmit the VHT packet to the one or more client stations via the antenna 112. From block 416, the flow ends.

Although FIG. 4 describes the access point transmitting a packet to one or more client stations, embodiments are not so limited. A group owner in a P2P network can transmit a packet to one or more client stations connected to the group owner. Furthermore, the client station can also transmit packets to the access point, the group owner, or to other client stations in the P2P network. The client station can determine an AID assigned to the access point and can execute operations described in blocks 406, 408, 414, and 416 to transmit a data payload to the access point. In some implementations, if multiple AIDs are assigned to the access point, the client station can select an appropriate AID of the access point to meet performance requirements (as will be further described below in FIG. 5).

In some implementations, two or more special GIDs can be assigned to identify the same type of packets or to identify the same group of client stations. For example, two or more special GIDs can be assigned to identify broadcast packets, a different set of two or more special GIDs can be assigned to identify single user transmission packets, etc. Furthermore, each group of client stations can be assigned two or more group identifiers. Likewise, two or more AIDs can be assigned to each client station or to an access point. Two or more AIDs can also be assigned to represent each type of special packets (i.e., special communications). As will be described below in FIG. 5, the access point (or the client station) can choose an appropriate AID and/or an appropriate GID based on performance requirements.

Figure 5:
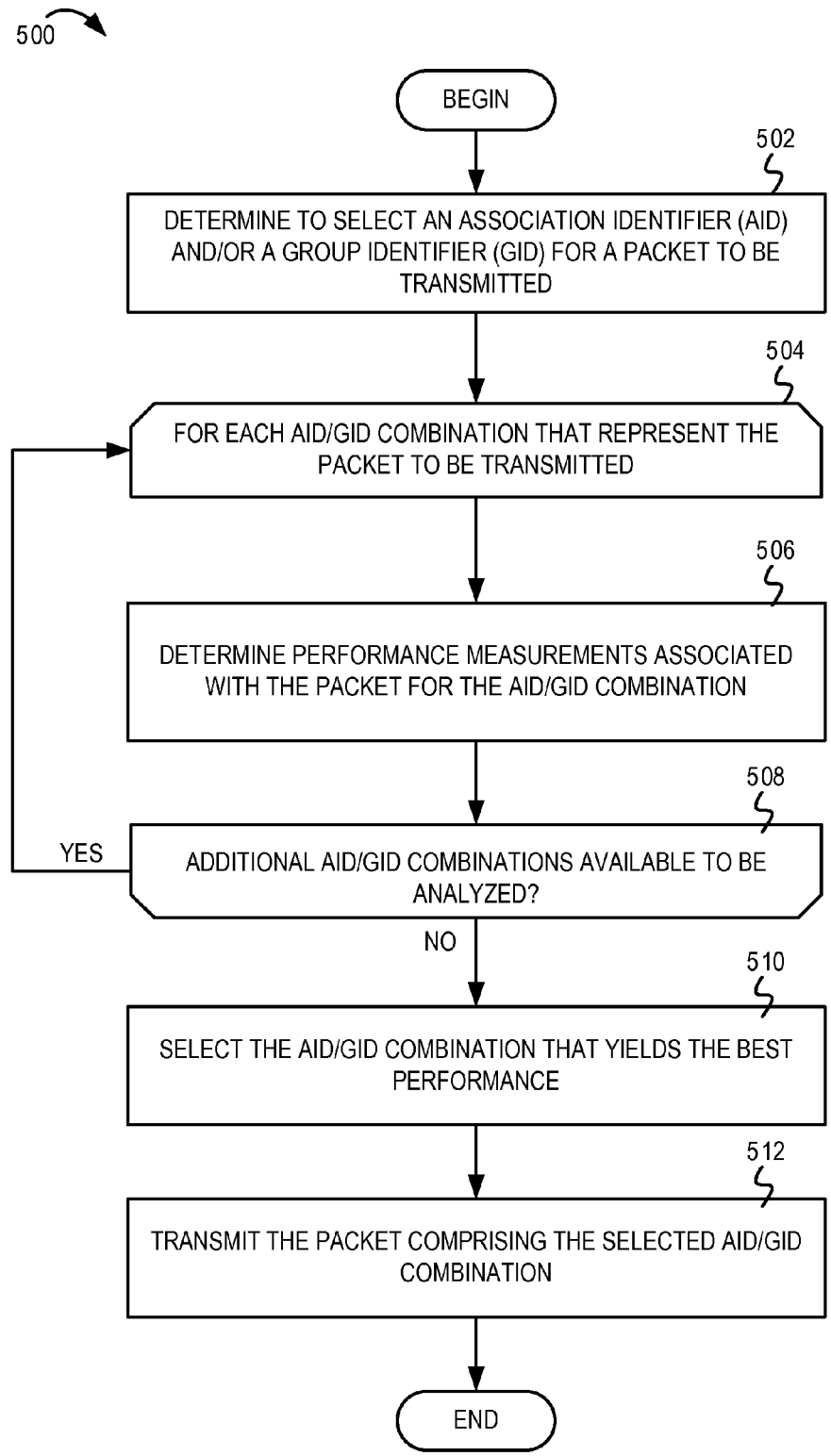
FIG. 5 is a flow diagram illustrating example operations for selecting an appropriate AID/GID based on performance requirements.

FIG. 5 is a flow diagram 500 illustrating example operations for selecting an appropriate AID/GID based on performance requirements. The flow 500 begins at block 502.

At block 502, it is determined that an AID and/or a GID should be selected for a destination device. The destination device may be a client station that receives packets from an access point or a group owner. For example, for a single user transmission, the AID/GID processing unit 110 of the access point can determine to select an AID of the client station and a special GID that indicates the single user transmission. As another example, for a multi-user transmission, the AID/GID processing unit 110 can determine to select a GID that represents a group of client stations. The destination device may also be an access point (or a group owner) that receives packets from connected client stations. As an example, when a client station is scheduled to transmit a STA-to-AP packet to the access point, the AID/GID processing unit 128 of the client station can determine to select an AID of the access point and a special GID that indicates a STA-to-AP packet. One or more AIDs and/or one or more GIDs may be identified based on the packet to be transmitted. For example, the access point may identify four AIDs associated with a client station and may identify three special GIDs that indicate a single user transmission. As another example, multiple special AIDs and/or multiple special GIDs assigned for STA-to-AP packets can be identified. As another example, multiple special AIDs and/or multiple special GIDs assigned for broadcast packets can be identified. The flow continues at block 504.

At block 504, a loop begins for each available AID/GID combination. For example, the AID/GID processing unit initiates a loop for analyzing each AID/GID combination. With reference to the above example, where the AID/GID processing unit 110 identifies four AIDs associated with the client station and identifies three special GIDs that indicate a single user transmission, the AID/GID processing unit 110 may analyze 12 AID/GID combinations. As will be described below with reference to blocks 506-510, the AID/GID processing unit 110 may analyze each AID/GID combination to select the AID/GID combination that meets predetermined performance requirements. The flow continues at block 506.

At block 506, performance measurements associated with the packet for the AID/GID combination is determined. In one example, a Peak-to-Average-Power-Ratio (PAPR) of the packet can be analyzed. In one example, the AID/GID processing unit 110 can calculate an exact PAPR of the VHT packet 300 for the AID/GID combination. As another example, the AID/GID processing unit 110 can count the number of zeros and ones before channel coding or after channel coding. It is noted that in other examples, other suitable performance measurements associated with the packet for the AID/GID combination can be determined. The flow continues at block 508.

At block 508, it is determined whether additional AID/GID combinations are available to be analyzed. If the AID/GID processing unit 110 determines that additional AID/GID combinations are available to be analyzed, the flow loops back to block 504, where the next AID/GID combination is inserted into the packet and performance measurements associated with the packet for the next AID/GID combination are determined. Otherwise, the flow continues at block 510.

At block 510, the AID/GID combination that yields that best performance is selected. For example, the AID/GID processing unit can compare performance measurements associated with each packet for each corresponding AID/GID combination. The AID/GID processing unit can select the AID/GID combination that yields the best performance or that meets predetermined performance measurements. For example, AID/GID processing unit can select the AID/GID combination that achieves a maximum reduction in the PAPR. Typically, a waveform that comprises a large number of zeros or ones is likely to have a high PAPR. The PAPR is likely to be smaller if the waveform comprises a random (almost uniform) distribution of 0s and 1s. The number of zeros and ones in the VHT-SIG field 102 can be indicative of the PAPR of the resultant signal. By allocating multiple AIDs for a single packet type or for a single destination device, each of the multiple AIDs results in different PAPR. Likewise, by allocating multiple GIDs for a single packet type or a single group of client stations, each of the multiple GIDs results in different PAPR. In one example, the AID/GID processing unit 110 can select the AID/GID combination which causes the VHT packet 300 to have the smallest PAPR. In another example, the AID/GID processing unit 110 can select the AID/GID combination which causes the VHT packet 300 to have a most balanced number of 0s and 1s. As another example, if N GIDs are assigned to each group of client stations in the BSS, the access point (or group owner) may select an appropriate GID (e.g., based on calculating the PAPR of the VHT packet using each GID, based on counting the number of ones and zeros, etc.) that minimizes the PAPR of the VHT packet to be transmitted to the group of client stations. The flow continues at block 512.

At block 512, the packet comprising the selected AID/GID combination is transmitted. From block 512, the flow ends.

Figure 6:
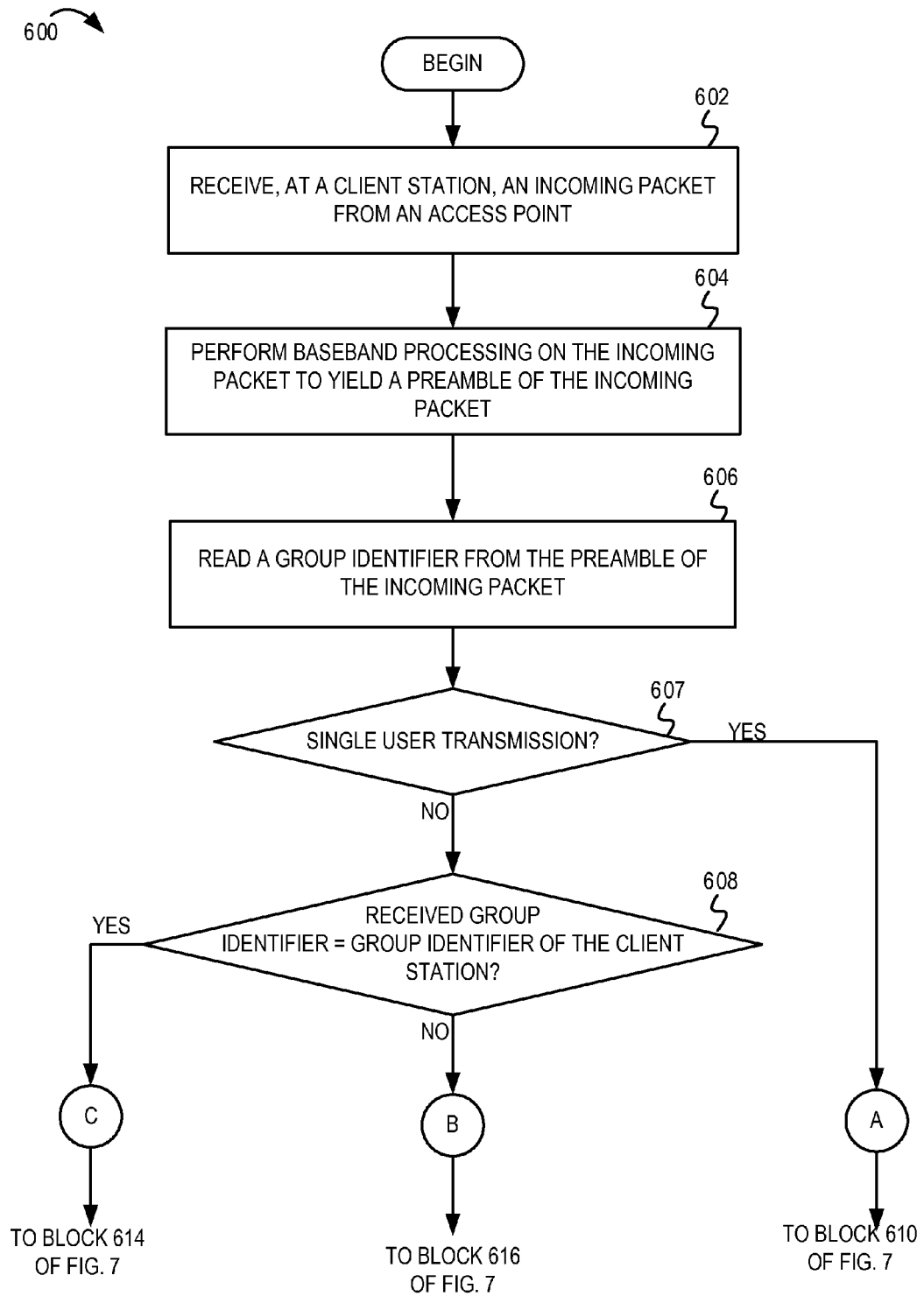
FIG. 6 is a flow diagram illustrating example operations for determining whether to switch to an inactive state.
Figure 7:
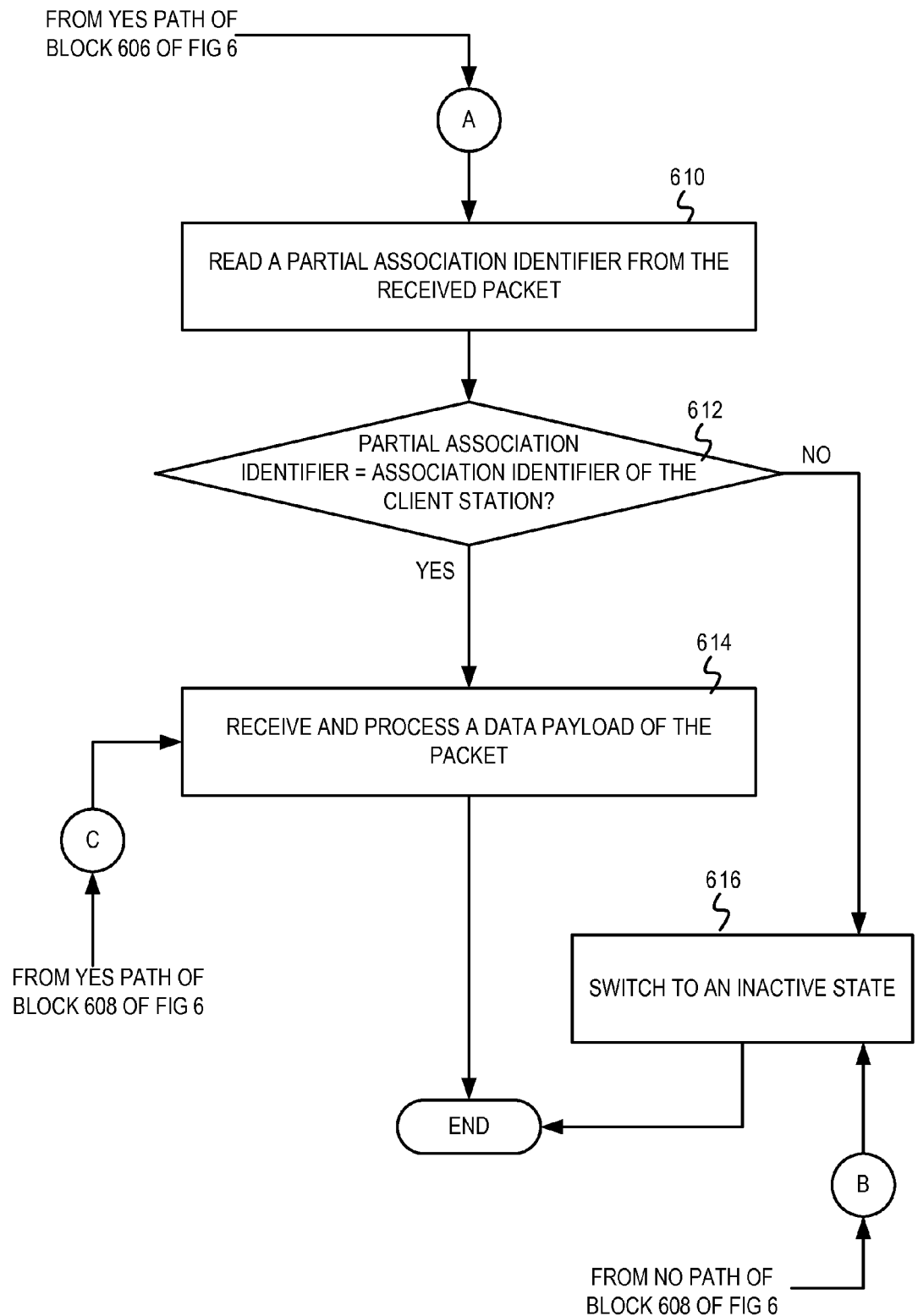
FIG. 7 is a continuation of FIG. 6 and also depicts the flow diagram illustrating example operations for determining whether to switch to an inactive state.

FIG. 6 and FIG. 7 depict a flow diagram 600 illustrating example operations for determining whether to switch to an inactive state. The flow 600 begins at block 602 in FIG. 6.

At block 602, a client station begins to receive an incoming packet transmitted by an access point. With reference to FIG. 1, the AFE 124 of the client station (e.g., the destination device 120) can begin to receive an incoming VHT packet 300 via an antenna 122. The AFE 124 can perform initial pre-processing operations (e.g., amplification, filtering, etc.) on the incoming VHT packet 300. The flow continues at block 604.

At block 604, baseband processing is performed on the incoming VHT packet to yield a preamble of the incoming VHT packet. In one implementation, a baseband processing unit 124 of the client station can perform baseband processing (e.g., decoding and demodulation operations) on the incoming VHT packet 300. The baseband processing unit 124 can extract the preamble 302 (or the VHT-SIG field) from the VHT packet 300 and can provide the preamble 302 to an AID/GID processing unit 128 for subsequent analysis. The flow continues at block 606.

At block 606, a GID is read from the preamble of the incoming VHT packet. For example, the AID/GID processing unit 128 can read the GID field 308 from the preamble 302 of the incoming VHT packet 300. The flow continues at block 608.

At block 607, it is determined whether the packet is a single user transmission. For example, based on the received GID 308 determined from the incoming VHT packet 300 at block 606, the AID/GID processing unit 128 can determine whether the VHT packet 300 is a single user transmission or a multi-user transmission. The AID/GID processing unit 128 can compare the received GID with one or more predetermined special GIDs that indicate a single user transmission. If the received GID is equal to one of the predetermined special GIDs that indicate a single user transmission, it may be determined that the VHT packet 300 is a single user transmission. Consequently, the flow continues at block 610 in FIG. 7, where the AID/GID processing unit 128 analyses a partial AID received in the incoming VHT packet 300 to determine whether to cause the client station to switch to the inactive state. If the received GID is not equal to any of the predetermined special GIDs that indicate a single user transmission, it may be determined that the VHT packet 300 is not a single user transmission. If the AID/GID processing unit 128 determines that the VHT packet 300 is a multi-user transmission, the flow continues at block 608.

At block 608, it is determined whether the received GID matches the GID assigned to the client station. For example, the AID/GID processing unit 128 can compare the received GID (determined at block 606) with one or more GIDs assigned to the client station and can determine whether the received GID matches the GID of a group to which the client station belongs. If the AID/GID processing unit 128 determines that the received GID is equal to one of the GIDs assigned to the client station, the flow continues at block 614 in FIG. 7. Otherwise, the flow continues at block 616 in FIG. 7.

At block 610 in FIG. 7, a partial AID is read from the preamble of the incoming VHT packet. For example, the AID/GID processing unit 128 of the client station can read the partial AID from the destination device information field 310 of the received VHT packet 300. The flow 600 moves from block 606 of FIG. 6 to block 610 of FIG. 7 if the received GID indicates that the VHT packet 300 is destined for a single client station. The partial AID in the preamble 302 of the VHT packet 300 can serve to uniquely identify one client station of the BSS governed by the access point. The flow continues at block 612.

At block 612, it is determined whether the partial AID received from the incoming VHT packet matches the AID of the client station. For example, the AID/GID processing unit 128 can compare the received partial AID with one or more AIDs assigned to the client station. In one example, the partial AID may represent 9 LSBs of the AID assigned to the client station. If the AID/GID processing unit 128 determines that the received partial AID matches the 9 LSBs of one of the AIDs assigned to the network device, it may be determined that the VHT packet 300 is destined for the client station. If the AID/GID processing unit 128 determines that the received partial AID is equal to the AID assigned to the client station, the flow continues at block 614. If the AID/GID processing unit 128 determines that the received partial AID is not equal to the AID assigned to the client station, the flow continues at block 616.

At block 614, a data payload of the VHT packet is received and processed. The flow 600 moves from block 608 of FIG. 6 to block 614 of FIG. 7 on determining that the received GID matches the GID assigned to the client station (for a multi-user transmission). The flow 600 also moves from block 612 in FIG. 7 to block 614 in FIG. 7 on determining that received partial AID is equal to the AID assigned to the client station (for a single user unicast transmission). On determining that the incoming VHT packet 300 is intended for the client station, the client station can continue to receive and process the VHT packet 300. For example, on determining that the incoming VHT packet 300 is intended for the client station, the baseband processing unit 126 can continue parsing the VHT packet 300 and can pass demodulated bits of the VHT packet 300 to the MAC unit 130 for further processing. From block 614, the flow ends.

At block 616, the client station switches to an inactive state. The flow 600 moves from block 608 of FIG. 6 to block 616 of FIG. 7 on determining that the received GID does not match the GID assigned to the client station (for a multi-user transmission). The flow 600 also moves from block 612 in FIG. 7 to block 616 in FIG. 7 on determining that received partial AID is not equal to the AID assigned to the client station (for a single user unicast transmission). On determining that the incoming VHT packet 300 is not intended for the client station, the AID/GID processing unit 128 can cause the client station to enter an inactive state. In one example, the AID/GID processing unit 128 can generate a notification indicating that the client station need not continue to receive the incoming VHT packet 300. The notification that indicates that the incoming VHT packet 300 is not intended for the client station can cause the client station to temporarily shut down radio hardware (or other processing devices), stop parsing/receiving the VHT packet 300, and switch to the inactive state (i.e., a power save mode or a low powered state). The client station can remain in the inactive state until a new packet is received at the client station, for a predetermined time interval, for a time interval that is determined by the length/data rate of the incoming packet, etc. It is noted that which radio devices/digital devices/software processing units of the client station are placed in a sleep or low power mode for power saving can vary depending on implementation of the client station. From block 616, the flow ends.

Figure 8:
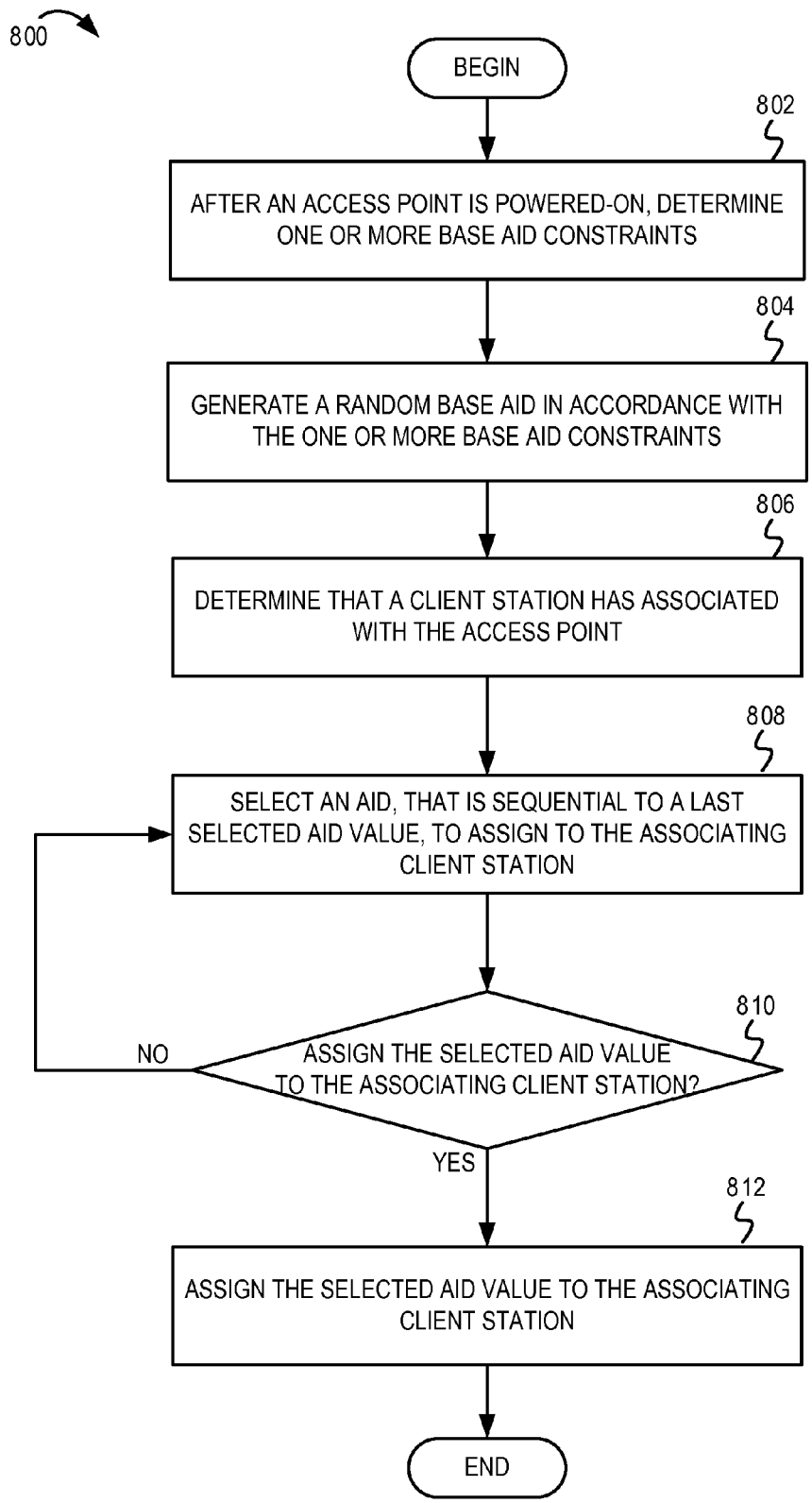
FIG. 8 is a flow diagram illustrating example operations for random base AID generation at the access point.

FIG. 8 is a flow diagram 800 illustrating example operations for random base AID generation at the access point. The flow 800 begins at block 802.

At block 802, after an access point is powered on, one or more base AID constraints are determined. For example, after the access point (e.g., the transmitting device 102 of FIG. 1) is powered on, the AID/GID processing unit 110 can determine the base AID constraints for selecting a base AID. The base AID represents a starting AID of the BSS governed by the access point and subsequent AID assignments begin from the base AID. In one implementation, the base AID may be designated as an AID associated with the access point. The base AID constraints can indicate an acceptable range of AIDs within which the base AID should lie. For example, if the AID is configured to be 11 bits long, the base AID constraints can indicate that the base AID should lie within the range [1, 2007]. In some implementations, if AID roundup (e.g., assigning an AID of "1" after assigning an AID of "2007") is not implemented to ensure protocol efficiency (e.g. for Traffic Indication Map (TIM) or delivery TIM (DTIM) protocol efficiency), the maximum number of client stations that can be supported by the access point may be taken into consideration when determining the base AID. For example, if the access point can support up to 200 client stations, the base AID constraints may indicate that a base AID that is larger than 1807 should not be selected.

The one or more base AID constraints can enable the AID/GID processing unit 110 to select the base AID so that the base AID does not overlap with base AIDs of other access points in OBSSs. The one or more base AID constraints can enable the AID/GID processing unit 110 to select the base AID so that subsequently assigned AIDs do not overlap with AIDs assigned to client stations in the OBSSs (i.e., to reduce the probability of client stations in the OBSSs being assigned same AID). In some implementations, the AID/GID processing unit 110 can analyze beacons or other packets transmitted by an access point of the OBSS to identify the base AIDs selected by the other access point of the OBSS. The AID/GID processing unit 110 could avoid duplication and overlapping of assigned AIDs in the OBSS by observing the base AIDs generated by the access point of the OBSS. In one example, the AID/GID processing unit 110 could receive a broadcast beacon that announces the base AID selected by the access point of the OBSS. In another example, the AID/GID processing unit 110 can sniff packets transmitted by the access point of the OBSS and can estimate the base AID generated by the access point of the OBSS. For example, if the AID/GID processing unit 110 sniffs packets with AIDs of 50, 200, 300, etc., the AID/GID processing unit 110 can determine to select a base AID that is sufficiently far away from the sniffed AIDs. As another example, the access point typically transmits a traffic indication map (TIM) as part of the beacon frame. The TIM can comprise AIDs associated with the client stations of the BSS. The AID/GID processing unit 110 can determine the AIDs assigned to client stations in the OBSS on analyzing the TIM read from a beacon frame transmitted by the access point of the OBSS. As another example, the AID/GID processing unit 110 could receive information that explicitly indicates which AIDs will be (or are being) used in the OBSS. The flow continues at block 804.

At block 804, a base AID is generated at random in accordance with the one or more base AID constraints. For example, the AID/GID processing unit 110 can generate a random (or pseudo-random) number after the access point is powered on. A random (or pseudo-random) number generator can be implemented on the access point to generate the random number which can then be used as the base AID. The random number generator can use any form of random distribution (e.g., a uniform distribution) or other suitable types of mapping to generate the base AID. In one implementation, the AID/GID processing unit 110 can dynamically configure the random number generator based on the base AID constraints to generate a random number (that can be used as the base AID) in accordance with the base AID constraints. For example, the base AID can be generated (in a random or pseudo-random manner) to be within an acceptable range of AIDs (e.g., within the range [1, 2007] for an 11-bit AID). Thus, the base AID may be selected to be smaller than 2007 to sequentially assign AIDs to associated client stations. As another example, if the access point can support up to 200 client stations, the base AID can be generated within the range [1, 1807]. As another example, if the AID constraints indicate that an access point of an OBSS has selected a base AID of 250, the AID/GID processing unit 110 can select a base AID of 100 (or another suitable base AID that is sufficiently separated from the base AID (i.e., 250) of the OBSS to reduce the probability of client stations in the OBSS sharing the same AID). In another implementation, the AID/GID processing unit 110 can compare the output of the random number generator with the base AID constraints to determine whether the random number generated by the random number generator satisfies the base AID constraints. If the random number generated by the random number generator does not satisfy the base AID constraints, the AID/GID processing unit 110 can cause the random number generator to generate a new random number. The flow continues at block 806.

At block 806, it is determined that a client station has associated with the access point. For example, the AID/GID processing unit 110 may receive an indication that the access point has exchanged probe request/response and association request/response messages with the client station and that the client station is part of the BSS governed by the access point. The flow continues at block 808.

At block 808, an AID that is sequential to a last selected AID is determined. For example, the AID/GID processing unit 110 may determine an AID that is to be assigned to the associating client station. The AID to be assigned to the associating client station may be selected to be sequential to the base AID (e.g., if the associating client is the first client station to connect to the access point) or sequential to a last selected AID. As an example, if the base AID is 100 and a first client station associates with the access point, the AID/GID processing unit 110 can determine to assign an AID of 101 to the associating first client station. Subsequently, if a second client station associates with the access point, the AID/GID processing unit 110 can determine to assign an AID of 102 to the associating second client station. Sequentially assigning AIDs (beginning from the base AID) to client stations that associate with the access point can result in efficiency of communication protocols. For example, a partial virtual bitmap field in a TIM information element of a WLAN packet comprises a TIM bitmap indicating traffic available for each client station with corresponding AID and a bitmap offset (e.g., a starting AID index for the TIM bitmap). If AIDs assigned to the client stations are not sequential, the TIM bitmap may be very large. Also, if AIDs assigned to the client stations are not sequential, it may be challenging for the access point to efficiently manage the client stations in the BSS. The flow continues at block 810.

At block 810, it is determined whether the AID selected at block 808 ("selected AID") should be assigned to the client station. For example, the AID/GID processing unit 110 determines whether the selected AID should be assigned to the client station. In determining whether the selected AID should be assigned to the client station, the AID/GID processing unit 110 can determine whether a partial AID of the selected AID matches a partial AID of one or more special AIDs. In other words, the AID/GID processing unit 110 can avoid assigning, to the associating client station, an AID that matches the partial AID of one or more special AIDs (i.e., special AIDs that identify multicast packets, broadcast packets, STA-to-AP packets, etc.). For example, if the partial AID of a special AID that indicates a broadcast packet comprises 9 zeros (as LSBs), the access point should avoid assigning AIDs 512, 1024, and 1536 (i.e., AIDs that have 9 zeros as their LSBs) to the client stations. Likewise, if the partial AID of a special AID that indicates a STA-to-AP packet comprises 9 ones (as LSBs), the access point should avoid assigning AIDs 511, 1023, and 1535 (i.e., AIDs that have 9 ones as their LSBs) to the client stations. If it is determined that the selected AID can be assigned to the associating client station, the flow continues at block 812. If it is determined that the selected AID should not be assigned to the associating client station, the flow loops back to block 808 where the AID/GID processing unit 110 can simply skip that particular selected AID and can select a next sequential AID. With reference to the above example, if the access point selects a base AID of "510", the access point can skip the AIDs 511 and 512, and assign the AID "513" to the first associating client station.

At block 812, the selected AID is assigned to the associating client station. For example, the AID/GID processing unit 110 can assign the selected AID to the associating client station. The AID/GID processing unit 110 can transmit a message to the associating client station identifying the AID assigned to the client station. The AID/GID processing unit 110 may also update a local data structure to record the AID assigned to the associating client station. It is also noted that in some implementations, the AID/GID processing unit 110 can select and assign more than one AID to the associating client station (e.g., for PAPR reduction), as was previously described herein. From block 812, the flow ends.

It is noted that although FIG. 8 describes the access point managing AIDs assigned to client stations connected to the access point, embodiments are not so limited. In other embodiments, other network coordinators could implement operations for assigning and managing AIDs assigned to connected client stations. For example, a group owner of a P2P network can assign AIDs to client stations connected to the group owner.

Figure 9:
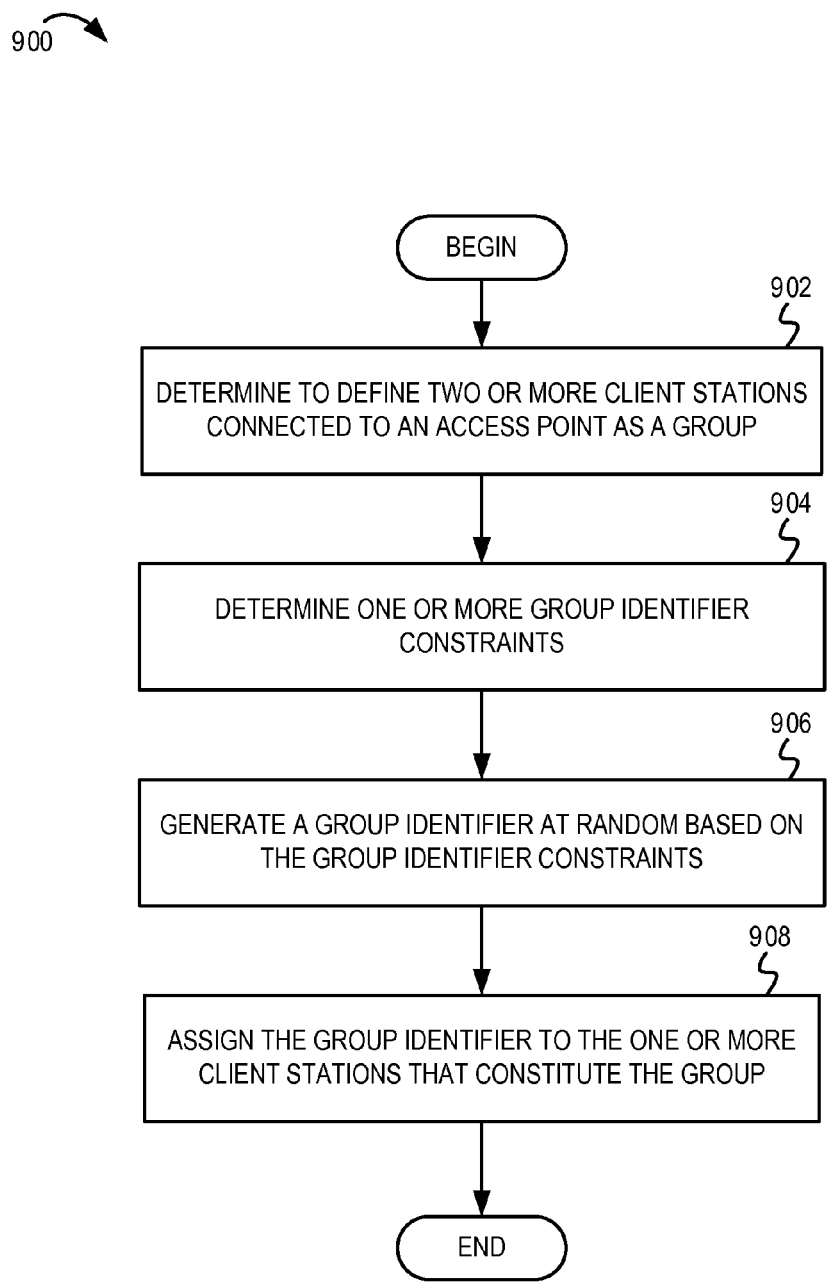
FIG. 9 is a flow diagram illustrating example operations of an access point for generating and assigning group identifiers to multiple client stations.

FIG. 9 is a flow diagram 900 illustrating example operations of an access point for generating and assigning group identifiers to multiple client stations. The flow 900 begins at block 902.

At block 902, it is determined that two or more client stations are to be assigned to a common group. For example, the access point can determine to define two or more client stations connected to the access point (i.e., in the same BSS as the access point) as a group. In assigning the two or more client stations to the same group, the access point can transmit multiple data streams to the group of client stations at the same time using spatial multiplexing (i.e., multi-user MIMO or MU-MIMO). In some implementations, a group may comprise only four client stations. In another example, the group can comprise any suitable number of client stations. Furthermore, a client stations can also be part of more than one group in a BSS. The flow continues at block 904.

At block 904, one or more group identifier constraints are determined. For example, an AID/GID processing unit 110 of the access point (e.g., the transmitting device 102 of FIG. 1) can determine one or more group identifier constraints according to which the GID for the group of client stations should be selected. As part of the group identifier constraints, the AID/GID processing unit 110 can ensure that a distinct GID (e.g., a GID that has not been assigned to other groups in the BSS, a GID that has not been assigned to a group in an OBSS, etc.) is generated. In some implementations, the AID/GID processing unit 110 can reserve a special GID for unicast packets, broadcast packets, and multicast packets. Thus, as part of the group identifier constraints, the AID/GID processing unit 110 can also ensure that the generated GID is distinct from one or more GIDs that have been allocated for special purposes (e.g., to indicate a STA-to-AP packet, a broadcast packet, etc.). In some implementations, a set of GIDs can be reserved for overloaded groups (e.g., groups that comprise more than a pre-determined number of client stations). The AID/GID processing unit 110 can ensure that the GID to be assigned to the group of client stations is within the range of non-overloaded GIDs (e.g., GIDs for groups that comprise less than the pre-determined number of client stations). The flow continues at block 906.

At block 906, a GID is generated at random based on the group identifier constraints. For example, the AID/GID processing unit 110 can randomly generate the GID to be assigned to the group of client stations determined at block 902. The AID/GID processing unit 110 can comprise a random (or a pseudo-random) number generator that generates the GID at random. In one example, six bits of the VHT packet 300 of FIG. 3 may be assigned to the GID field 308 and, therefore, the AID/GID processing unit 110 may generate a six-bit random number as the GID to be assigned to the group of client stations. It is noted that because the AID/GID processing unit 110 need not assign consecutive GIDs to the groups of client stations supported by the access point, the random number generator can be used to generate a GID each time the access point creates a group of client stations. In one implementation, the AID/GID processing unit 110 can dynamically configure the random number generator to generate a random GID in accordance with the group identifier constraints. For example, on determining that the GID "000000" represents STA-to-AP packets and that the GID "111000" is assigned to a first group of network devices, the AID/GID processing unit 110 can configure the random number generator to generate a GID that is not equal to "000000" or "111000" for a second group of network devices. In another implementation, the AID/GID processing unit 110 can compare the GID generated by the random number generator with the group identifier constraints to determine whether the generated GID satisfies the GID constraints. If the generated GID does not satisfy the GID constraints, the AID/GID processing unit 110 can cause the random number generator to generate a new GID. The flow continues at block 908.

At block 908, the generated GID is assigned to the client stations that constitute the group. For example, with reference to FIG. 2, the AID/GID processing unit 110 can assign the generated GID to the client stations 120, 140, and 150 that constitute the group 160. The AID/GID processing unit 110 can transmit a message to each of the client stations 120, 140, and 150 that constitute the group 160 identifying the GID assigned to the group 160. The AID/GID processing unit 110 may also update a local data structure to record the GID assigned to the group of client stations. It is also noted that in some implementations, the AID/GID processing unit 110 can select and assign more than one GID to the group of client stations (e.g., for PAPR reduction), as was previously described herein. From block 908, the flow ends.

It is noted that although FIG. 9 describes the access point managing GIDs assigned to groups of client stations connected to the access point, embodiments are not so limited. In other embodiments, other network coordinators could implement operations for assigning and managing GIDs assigned to connected groups of client stations. For example, a group owner of a P2P network can assign GIDs to groups of client stations connected to the group owner.

It should be understood that the depicted diagrams (FIGS. 1-9) are examples meant to aid in understanding embodiments and should not be used to limit embodiments or limit scope of the claims. Embodiments may perform additional operations, fewer operations, operations in a different order, operations in parallel, and some operations differently. For instance, although FIG. 8 describes the access point generating the base AID depending on a number of client stations that can be supported at the access point, embodiments are not so limited. In some implementations, the access point can select the base AID at random and can adjust the base AID depending on whether or not additional AIDs are required for assignment to client stations. For example, the access point may select 2000 as the base AID and may assign AIDs to 7 client stations (e.g., from AID 2001 to AID 2007). When an 8$^{th}$ client station tries to associate with the access point, the access point may adjust the base AID to 1999 and may assign an AID of 2000 to the new client station. In other implementations, the access point could select a base AID at random and could allocate AIDs to the client stations in a reverse sequential manner (e.g., in a decrementing manner). For example, if the access point selects 2000 as the base AID, the access point could assign AIDs 1999, 1998, 1997, and so on to client stations.

Also, in one implementation, the operations for determining whether to receive the VHT packet 300 or whether to switch to the inactive state (e.g., the power save mode) can be executed within a baseband processing unit 126 of the destination device 120, as described above in FIGS. 1-2. In another implementation, however, the operations for determining whether to receive the VHT packet 300 or whether to switch to the power save mode can be executed within the MAC unit 130 of the destination device 120. In some implementations, if the baseband processing unit 126 determines that the destination device 120 should switch to the power save mode, the baseband processing unit 126 may (or may not) notify the MAC unit 130. Because the destination device 120 determines whether to switch to the power save mode during the preamble (which is very short as compared to the payload), switching to the power save mode after receiving the preamble can enable the destination device to achieve significant power savings.

Furthermore, as client stations (e.g., the destination device 120) disassociate from the access point (e.g., the transmitting device 102), the access point can de-allocate the AIDs previously allocated to the disassociated client stations. The access point can shift the AIDs allocated to connected client stations so that the TIM bitmap comprises consecutive AIDs. For example, an access point may assign AIDs 2000-2007 to seven client stations. After the client station with AID 2005 disassociates from the access point, the access point may shift the AIDs assigned to the connected client stations so that AIDs 2000-2006 are now assigned to the six connected client stations. Also, if the range of AIDs allocated by OBSSs is within a threshold value, an access point in one of the OBSSs can dynamically shift that AIDs assigned to its connected client stations. For example, a first access point in one BSS may have a base AID of 100 and a second access point in an OBSS may have a base AID of 150. The first access point may configure an AID threshold value of "20". Thus, if the last assigned AID is 130 and is 20 values apart from the base AID of the second access point in the OBSS (e.g., if 30 client stations connect to the first access point), the first access point can dynamically select a new base AID (e.g., a base AID of 500) and can reassign new AIDs to the connected client stations beginning from the new base AID to avoid conflict with the OBSS of the second access point.

As described above with reference to FIG. 5, multiple AIDs can be assigned to each client station connected to an access point and the access point can choose an appropriate AID of the client station based on performance requirements (e.g., PAPR reduction). Also, the AIDs may be sequentially assigned to client stations in the BSS to yield a small traffic indication map (TIM) bitmap to minimize the size of the TIM bitmap and to minimize transmission overhead. Therefore, as an example, to assign two AIDs to each client station in the BSS, one set of AIDs can be assigned starting at AID 1 and a second set of AIDs can be assigned starting at AID 101. Thus, a first client station can be assigned AIDs of 1 and 101, a second client station can be assigned AIDs of 2 and 102, etc. In general, if N AIDs are assigned to each client station, the access point (or group owner) may maintain N TIM bitmaps such that each TIM bitmap comprises one AID of each client station to reduce the size of the TIM bitmap.

Lastly, to enable power saving based on checking the partial AID, a special AID for an access point (or a group owner) can be defined so that all STA-to-AP packets use a same special AID in the partial AID field. By assigning the special AID for the access point, the STA-to-AP packets can be distinguished from broadcast/multicast packets transmitted by the access point or other special transmissions. The special AID for the access point can be selected to be one or more suitable values. In one example, one special AID for the access point can be predetermined (e.g., a combination of all 1s) and all the client stations can use the same special AID to identify the STA-to-AP packets. Thus, instead of a common special AID that represents all the special packets (e.g., broadcast packets, multicast packets, and STA-to-AP packets), two or more special AIDs can be generated—one special AID that identifies that STA-to-AP packets and another special AID that identifies broadcast/multicast packets. As described above, in some implementations, each special type of packet can be assigned more than one distinct AID. For example, two special AIDs may be assigned to identify the STA-to-AP packets and two other distinct special AIDs may be assigned to identify the broadcast/multicast packets. The appropriate AID can be selected to meet performance requirements (e.g., PAPR reduction). It is noted that in assigning the special AIDs (e.g., AIDs that identify the access point, broadcast packet, multicast packets, etc.) the access point (or the group owner) should ensure that AIDs that have the same partial AID as that of the special AIDs should not be assigned to client stations in the BSS.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
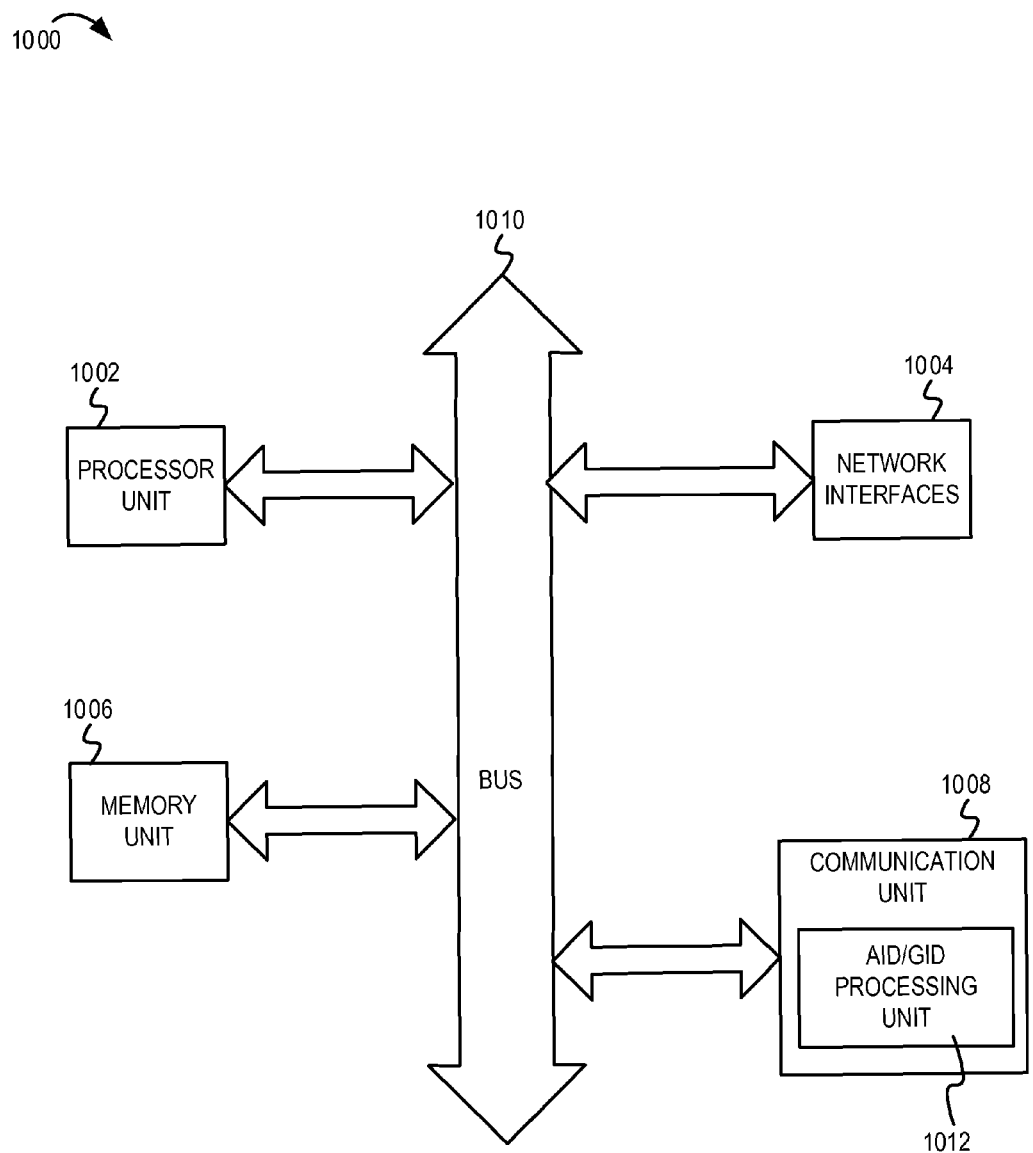
FIG. 10 is a block diagram of a wireless device including a mechanism for packet identification for power saving in wireless communication networks.

FIG. 10 is a block diagram of a wireless device including a mechanism for packet identification for power saving in wireless communication networks. In one implementation, the wireless device 1000 may be a WLAN device (e.g., a WLAN chip or integrated circuit) included within an access point, a group owner, or other suitable network coordinating device capable of managing client devices in a BSS. In another implementation, the wireless device 1000 may be a WLAN device included within a client device such as a laptop, personal computer (PC), mobile phone, netbook, smart phone, or other suitable electronic device capable of communicating with the access point, the group owner, or other suitable network coordinator. The wireless device 1000 includes a processor unit 1002 (possibly including multiple processors, multiple cores, multiple nodes, and/or implementing multi-threading, etc.). The wireless device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless device 1000 also includes a bus 1010 (e.g., PCI, ISA, PCI-Express, HyperTransport®, InfiniBand®, NuBus, etc.), and network interfaces 1004 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The wireless device 1000 also includes a communication unit 1008. In one implementation, the communication unit 1008 comprises an AID/GID processing unit 1012. When implemented on a network coordinating device such as an access point, the AID/GID processing unit 1012 comprises the functionality described above, e.g., with reference to FIGS. 1-5 and 8-9. When implemented on a client device connected to the network coordinating device, the AID/GID processing unit 1012 comprises the functionality described above, e.g., with reference to FIGS. 1-3 and 6-7.

Any one of the above-described functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., additional network interfaces, peripheral devices, etc.). The processor unit 1002 and the network interfaces 1004 are coupled to the bus 1010. Although illustrated as being coupled to the bus 1010, the memory 1006 may be coupled to the processor unit 1002.

While the embodiments are described with reference to various implementations and exploitations, it will be understood that these embodiments are illustrative and that the scope of the inventive subject matter is not limited to them. In general, packet identification for power saving in wireless communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
randomly generating, at a first network coordinator of a wireless communication network, a base association identifier that is representative of the first network coordinator based on one or more association identifier constraints;
determining, at the first network coordinator, to associate with a client device of the wireless communication network;
selecting, at the first network coordinator, at least one association identifier for the client device based, at least in part, on the base association identifier;
assigning the at least one association identifier to represent the client device; and
in response to determining to transmit a packet to the client device, inserting at least a predefined number of bits of a first of the at least one association identifier in the packet to identify the client device and inserting, in the packet, a group identifier that indicates that the packet is destined for a single client device.

2. The method of claim 1, wherein the association identifier constraints indicate at least one of:
a predetermined range of association identifiers,
a maximum number of client devices that can be supported by the first network coordinator,
a base association identifier associated with a second network coordinator that is proximate to the first network coordinator,
association identifiers assigned to client devices associated with the second network coordinator,
one or more special association identifiers within the predetermined range of association identifiers that represent special communications, and
one or more association identifiers within the predetermined range of association identifiers that are associated with the one or more special association identifiers, wherein the predefined number of bits of the one or more association identifiers match corresponding predefined number of bits of the one or more special association identifiers that represent special communications.

3. The method of claim 1, further comprising assigning one or more special association identifiers within a predetermined range of association identifiers to represent special communications.

4. The method of claim 3, wherein said assigning the at least one association identifier to represent the client device further comprises:
determining a plurality of association identifiers to be assigned to represent the client device;
for each of the plurality of association identifiers to be assigned to represent the client device,
determining whether the predefined number of bits of the association identifier matches the corresponding predefined number of bits of the one or more special association identifiers that represent the special communications;
assigning the association identifier to represent the client device in response to determining that the predefined number of bits of the association identifier does not match the corresponding predefined number of bits of the one or more special association identifiers that represent the special communications; and
determining to not assign the association identifier to represent the client device in response to determining that the predefined number of bits of the association identifier matches the corresponding predefined number of bits of the one or more special association identifiers that represent the special communications.

5. The method of claim 3 wherein the one or more special association identifiers that represent the special communications comprise at least one of a first special association identifier that represents unicast packets transmitted by client devices to the first network coordinator, a second special association identifier that represents multicast packets transmitted by the first network coordinator to a plurality of client devices associated with the first network coordinator, and a third special association identifier that represents broadcast packets transmitted by the first network coordinator to the plurality of client devices associated with the first network coordinator.

6. The method of claim 1, wherein said assigning the at least one association identifier to represent the client device comprises:
storing, at the first network coordinator, an indication of the at least one association identifier assigned to represent the client device; and
transmitting, to the client device, the indication of the at least one association identifier assigned to represent the client device.

7. The method of claim 1, wherein said inserting at least the predefined number of bits of the first of the at least one association identifier in the packet to identify the client device and inserting, in the packet, the group identifier that indicates that the packet is destined for a single client device further comprises: identifying a plurality of association identifiers assigned to represent the client device; determining performance measurements associated with each of a plurality of candidate packets comprising a corresponding each of the plurality of association identifiers assigned to represent the client device; comparing the performance measurements associated with each of the candidate packets comprising the corresponding each of the plurality of association identifiers assigned to represent the client device; determining that a first candidate packet comprising a first of the plurality of association identifiers corresponds to a best of the performance measurements in response to said comparing the performance measurements associated with each of the candidate packets comprising the corresponding each of the plurality of association identifiers assigned to represent the client device; and determining to insert at least the predefined number of bits of the first of the plurality of the association identifiers in the packet to be transmitted to the client device to identify the client device.

8. The method of claim 7, wherein the performance measurement indicates a peak to average power ratio (PAPR) of the packet.

9. The method of claim 1, wherein said inserting at least the predefined number of bits of the first of the at least one association identifier in the packet to identify the client device and inserting, in the packet, the group identifier that indicates that the packet is destined for a single client device further comprises: identifying a plurality of association identifiers assigned to represent the client device and a plurality of group identifiers that indicate that the packet is destined for a single client device; determining performance measurements associated with each of a plurality of candidate packets comprising a corresponding combination of one of the plurality of association identifiers and one of the plurality of group identifiers; comparing the performance measurements associated with each of the candidate packets comprising the corresponding combination of one of the plurality of association identifiers and one of the plurality of group identifiers; determining that a first candidate packet comprising a combination of a first of the plurality of association identifiers and a first of the plurality of group identifiers corresponds to a best of the performance measurements in response to said comparing the performance measurements associated with each of the candidate packets comprising the corresponding combination of one of the plurality of association identifiers and one of the plurality of group identifiers; and determining to insert, in the packet to be transmitted to the client device, at least the predefined number of bits of the first of the plurality of the association identifiers to identify the client device and the first of the plurality of group identifiers to indicate that the that the packet is destined for a single client device.

10. The method of claim 1, wherein the first network coordinator comprises an access point of an infrastructure wireless communication network or a group owner of a peer-to-peer wireless communication network.

11. A wireless network device of a wireless communication network comprising: a processor; a network interface coupled to the processor; an association identifier (AID) and group identifier (GID) processing unit coupled to the network interface and to the processor, the AID/GID processing unit operable to: randomly generate a base association identifier that is representative of the wireless network device based on one or more association identifier constraints; assign at least one association identifier to a client device of the wireless communication network connected to the wireless network device based, at least in part, on the base association identifier; randomly generate at least one group identifier for the client device based, at least in part, on one or more group identifier constraints; assign the at least one group identifier to the client device; and in response to determining to transmit a packet to the client device, insert, in the packet to identify the client device, at least a predefined number of bits of one of the at least one association identifier assigned to the client device and one of the at least one group identifier assigned to the client device, wherein the one of the at least one group identifier assigned to the client device indicates that the packet is destined for a single client device.

12. The wireless network device of claim 11,
wherein the association identifier constraints indicate at least one of:
a predetermined range of association identifiers,
a maximum number of client devices that can be supported by the wireless network device,
a base association identifier associated with a second wireless network device that is proximate to the wireless network device,
association identifiers assigned to client devices associated with the second wireless network device,
one or more special association identifiers within the predetermined range of association identifiers that represent special communications, and
one or more association identifiers within the predetermined range of association identifiers that are associated with the one or more special association identifiers, wherein the predefined number of bits of the one or more association identifiers match corresponding predefined number of bits of the one or more special association identifiers that represent special communications; and
wherein the group identifier constraints indicate at least one of:
a predetermined range of group identifiers,
a maximum number of groups of client devices that can be supported by the wireless network device,
group identifiers assigned to groups of client devices associated with the second wireless network device, and
one or more special group identifiers within the predetermined range of group identifiers that represent special communications.

13. The wireless network device of claim 12,
wherein the one or more special association identifiers that represent the special communications comprise at least one of a first special association identifier that represents unicast packets transmitted by client devices to the wireless network device, a second special association identifier that represents multicast packets transmitted by the wireless network device to the plurality of client devices associated with the wireless network device, and a third special association identifier that represents broadcast packets transmitted by the wireless network device to the plurality of client devices associated with the wireless network device; and
wherein the one or more special group identifiers that represent the special communications comprise at least one of a first special group identifier that represents unicast packets transmitted by the client devices to the wireless network device, a second special group identifier that represents broadcast packets transmitted by the wireless network device to the client devices associated with the wireless network device.

14. The wireless network device of claim 11, wherein the AID/GID processing unit operable to assign the at least one group identifier to the client device further comprises the AID/GID processing unit operable to: determine a plurality of group identifiers to be assigned to represent a single client device; for each of the plurality of group identifiers to be assigned to represent a single client device, determine whether the group identifier matches one or more special group identifiers that represent special communications; assign the group identifier to represent a single client device client device in response to the AID/GID processing unit determining that the group identifier does not match the one or more special group identifiers that represent the special communications; and determine to not assign the group identifier to represent a single client device in response to the AID/GID processing unit determining that the group identifier matches the one or more special group identifiers that represent the special communications.

15. The wireless network device of claim 11, wherein the AID/GID processing unit operable to assign the at least one association identifier to the client device further comprises the AID/GID processing unit operable to:
determine a plurality of association identifiers to be assigned to represent the client device;
for each of the plurality of association identifiers to be assigned to represent the client device,
determine whether the predefined number of bits of the association identifier matches the corresponding predefined number of bits of one or more special association identifiers that represent special communications;
assign the association identifier to represent the client device in response to the AID/GID processing unit determining that the predefined number of bits of the association identifier does not match the corresponding predefined number of bits of the one or more special association identifiers that represent the special communications; and
determine to not assign the association identifier to represent the client device in response to the AID/GID processing unit determining that the predefined number of bits of the association identifier matches the corresponding predefined number of bits of the one or more special association identifiers that represent the special communications.

16. The wireless network device of claim 11, wherein the AID/GID processing unit operable to insert at least the predefined number of bits of one of the at least one association identifier assigned to the client device and one of the at least one group identifier assigned to the client device further comprises the AID/GID processing unit operable to:
identify a plurality of association identifiers and a plurality of group identifiers assigned to the client device;
determine performance measurements associated with each of a plurality of candidate packets comprising a corresponding combination of one of the plurality of association identifiers and one of the plurality of group identifiers;
compare the performance measurements associated with each of the candidate packets comprising the corresponding combination of one of the plurality of association identifiers and one of the plurality of group identifiers;
determine that a first candidate packet comprising a combination of a first of the plurality of association identifiers and a first of the plurality of group identifiers corresponds to a best of the performance measurements in response to the AID/GID processing unit comparing the performance measurements associated with each of the candidate packets comprising the corresponding combination of one of the plurality of association identifiers and one of the plurality of group identifiers; and
determine to insert, in the packet to be transmitted to the client device, at least the predefined number of bits of the first of the plurality of the association identifiers and the first of the plurality of group identifiers to identify the client device.

17. One or more non-transitory machine-readable storage media, having instructions stored therein, which, when executed by one or more processors causes the one or more processors to perform operations that comprise: randomly generating, at a network coordinator, a base association identifier that is representative of the network coordinator based on one or more association identifier constraints; assigning at least one association identifier to a client device connected to the network coordinator based, at least in part, on the base association identifier; randomly generating at least one group identifier for the client device based, at least in part, on one or more group identifier constraints; assigning the at least one group identifier to the client device; and in response to determining to transmit a packet to the client device, inserting, in the packet to identify the client device, at least a predefined number of bits of one of the at least one association identifier assigned to the client device and one of the at least one group identifier assigned to the client device, wherein the one of the at least one group identifier assigned to the client device indicates that the packet is destined for a single client device.

18. The one or more machine-readable storage media of claim 17, wherein said operation of assigning the at least one group identifier to the client device further comprises: determining a plurality of group identifiers to be assigned to represent a single client device that comprise the client device; for each of the plurality of group identifiers to be assigned to represent a single client device, determining whether the group identifier matches one or more special group identifiers that represent special communications; assigning the group identifier to represent a single client device in response to determining that the group identifier does not match the one or more special group identifiers that represent the special communications; and determining to not assign the group identifier to represent a single client device in response to determining that the group identifier matches the one or more special group identifiers that represent the special communications.

19. The one or more machine-readable storage media of claim 17, wherein said operation of assigning the at least one association identifier to the client device further comprises:
determining a plurality of association identifiers to be assigned to represent the client device;
for each of the plurality of association identifiers to be assigned to represent the client device,
determining whether the predefined number of bits of the association identifier matches the corresponding predefined number of bits of one or more special association identifiers that represent special communications;
assigning the association identifier to represent the client device in response to determining that the predefined number of bits of the association identifier does not match the corresponding predefined number of bits of the one or more special association identifiers that represent the special communications; and
determining to not assign the association identifier to represent the client device in response to determining that the predefined number of bits of the association identifier matches the corresponding predefined number of bits of the one or more special association identifiers that represent the special communications.

20. The one or more machine-readable media of claim 17, wherein said operation of inserting at least the predefined number of bits of one of the at least one association identifier assigned to the client device and one of the at least one group identifier assigned to the client device further comprises:
identifying a plurality of association identifiers and a plurality of group identifiers assigned to the client device;
determining performance measurements associated with each of a plurality of candidate packets comprising a corresponding combination of one of the plurality of association identifiers and one of the plurality of group identifiers;
comparing the performance measurements associated with each of the candidate packets comprising the corresponding combination of one of the plurality of association identifiers and one of the plurality of group identifiers;
determining that a first candidate packet comprising a combination of a first of the plurality of association identifiers and a first of the plurality of group identifiers corresponds to a best of the performance measurements in response to said comparing the performance measurements associated with each of the candidate packets comprising the corresponding combination of one of the plurality of association identifiers and one of the plurality of group identifiers; and
determining to insert, in the packet to be transmitted to the client device, at least the predefined number of bits of the first of the plurality of the association identifiers and the first of the plurality of group to identify the client device.

* * * * *